(12) United States Patent
Idem et al.

(10) Patent No.: US 9,586,175 B2
(45) Date of Patent: Mar. 7, 2017

(54) CATALYTIC METHOD AND APPARATUS FOR SEPARATING A GASEOUS COMPONENT FROM AN INCOMING GAS STREAM

(75) Inventors: Raphael Idem, Regina (CA); Huancong Shi, Regina (CA); Don Gelowitz, Regina (CA); Paitoon Tontiwachwuthikul, Regina (CA)

(73) Assignee: UNIVERSITY OF REGINA, Regina, Saskatchewan (CA)

( * ) Notice: Subject to any disclaimer, the term of this patent is extended or adjusted under 35 U.S.C. 154(b) by 353 days.

(21) Appl. No.: 13/638,922

(22) PCT Filed: Mar. 29, 2011

(86) PCT No.: PCT/CA2011/000328
§ 371 (c)(1),
(2), (4) Date: Jan. 14, 2013

(87) PCT Pub. No.: WO2011/120138
PCT Pub. Date: Oct. 6, 2011

(65) Prior Publication Data
US 2013/0108532 A1 May 2, 2013

Related U.S. Application Data

(60) Provisional application No. 61/319,151, filed on Mar. 30, 2010.

(51) Int. Cl.
*B01D 53/14* (2006.01)
*B01D 53/40* (2006.01)
(Continued)

(52) U.S. Cl.
CPC ......... *B01D 53/40* (2013.01); *B01D 53/1425* (2013.01); *B01D 53/1456* (2013.01);
(Continued)

(58) Field of Classification Search
None
See application file for complete search history.

(56) References Cited

U.S. PATENT DOCUMENTS

2003/0140620 A1* 7/2003 Shigapov et al. ............. 60/286
2008/0280750 A1* 11/2008 Liu ................................. 502/63
(Continued)

FOREIGN PATENT DOCUMENTS

CA 2686969 A1 11/2008
CA 2729956 A1 2/2011
(Continued)

OTHER PUBLICATIONS

Lu et al., "Properties and Characterization of Modified HZSM-5 Zeolites", Journal of Natural Gas Chemistry 12/(2003) 56-62.*
Kruk et al., "Characterization of Highly Ordered MCM-41 Silicas Using X-ray Diffraction and Nitrogen Adsorption", Langmuir 1999, 15, 5279-5284.*
(Continued)

*Primary Examiner* — Jennifer A Smith
*Assistant Examiner* — Anita Nassiri Motlagh
(74) *Attorney, Agent, or Firm* — Parker Highlander PLLC

(57) ABSTRACT

A process for separating at least a portion of an acid gas from a gaseous mixture, said process comprising contacting the gaseous mixture with an absorption medium and/or adsorption medium, wherein said medium absorbs and/or adsorbs at least a portion of the acid gas to form a rich medium; and separating at least a portion of the acid gas from the rich medium to form a lean medium; wherein the separation step is performed in the presence of an acid catalyst.

11 Claims, 12 Drawing Sheets

(51) Int. Cl.
  *B01D 53/62* (2006.01)
  *B01D 53/96* (2006.01)
  *B01D 53/86* (2006.01)

(52) U.S. Cl.
  CPC .............. *B01D 53/62* (2013.01); *B01D 53/96* (2013.01); *B01D 53/86* (2013.01); *B01D 2252/103* (2013.01); *B01D 2252/20405* (2013.01); *B01D 2252/20421* (2013.01); *B01D 2252/20484* (2013.01); *B01D 2252/602* (2013.01); *B01D 2255/00* (2013.01); *B01D 2257/2045* (2013.01); *B01D 2257/302* (2013.01); *B01D 2257/304* (2013.01); *B01D 2257/404* (2013.01); *B01D 2257/504* (2013.01)

(56) References Cited

U.S. PATENT DOCUMENTS

| 2009/0155889 A1 | 6/2009 | Handagama et al. |
| 2009/0238742 A1 | 9/2009 | Liu et al. |

FOREIGN PATENT DOCUMENTS

| WO | 2008027510 A2 | 3/2008 |
| WO | 2009117546 A1 | 9/2009 |
| WO | 2009117550 A1 | 9/2009 |
| WO | 2010/027929 A1 | 3/2010 |
| WO | WO 2010027929 A1 * | 3/2010 |

OTHER PUBLICATIONS

Krahl et al., "The very strong solid Lewis acids aluminium chlorofluoride (ACF) and bromofluoride (ABF)—Synthesis, structure, and Lewis acidity", Journal of Fluorine Chemistry 127 (2006) 663-678.*

Pines et al. (Pines et al., "Alumina: Catalyst and Support. I. Alumina, its Intrinsic Acidity and Catalytic Activity", May 20, 1960).*

International Search Report and Written Opnion of PCT/CA2011/000328, Oct. 2, 2012.

Hicks, Jason C. et al., "Designing Adsorbents for CO2 Capture from Flue Gas-Hyperbranched Aminosilicas Capable of Capturing CO2 Reversibly". J. Am. Chem. Soc., 2008, vol. 130, pp. 2902-2903.

Belmabkhout, Youseff, et al., "Adsoprtion of Co2-Containing Gas Mixtures over Amine-Bearing Pore Expanded MCM-41 Silica: Application for Gas Purification", Ind. Eng. Chem. Res. 2010, vol. 49, pp. 359-365.

Zehng, Feng, et al., "Ethylenediamine-Modified SBS-15 as Regnerabie CO2 Sorbents", Prepr. Pap.-Am. Chem. Soc., Div. Fuel Chem., 2004, vol. 49(1), pp. 261-262.

Hattori, Hideshi, "Heterogenious Basic Catalysis", Chem. Rev., 1995, vol. 95, pp. 537-558.

Feng, Bo et al., "Reduction of Energy Requirement of CO2 Desorption by Adding Acid into CO2-Loaded Solvent", Energy Fuels, 2010, 24, pp. 213-219.

Extended European Search Report for 11761861.1, Dated Jun. 23, 2015.

* cited by examiner

MEA + $CO_2$

Zwitterion

MEA-$CO_2^-$

Without catalyst: $Ea = \Delta H_1 + \Delta H_2 - \Delta H_{exp}$    ($\Delta H_1 = 8.5$, $\Delta H_2 = 5.4$ kcal/mol)

With catalyst: $Ea' = \Delta H'_1 + \Delta H'_2 + \Delta H_{exp}$    ($\Delta H_1 = 5.4$, $\Delta H_2 < 5.4$ kcal/mol)

Attachment → Transition State → Split to MEA + $CO_2$ → Detachment

Overall reaction: Zwitterion $\xrightarrow{(Al)}$ MEA + $CO_2$

CATALYTIC METHOD AND APPARATUS FOR SEPARATING A GASEOUS COMPONENT FROM AN INCOMING GAS STREAM

FIELD

This disclosure relates to the use of a catalyst in the separation of a component or components from a gas stream. In one aspect a multi-component gas stream comprising an acid gas (e.g. carbon dioxide ($CO_2$), hydrogen sulfide ($H_2S$), etc.) is at least partially purified of said acid gas.

BACKGROUND

A wide variety of technologies exist for removing a component or components from a mixture that also includes other components. These include distillation, gas absorption, rectification, stripping, regeneration, solvent extraction, etc. In each case, the traditional technology involves the use of vessels, example columns, to effect separation. Specifically, in the cases of distillation, gas absorption, stripping, rectification, regeneration, etc., the columns contain column internals such as packing or trays which are devices to provide the surface area for contact between two phases to cause the separation of components. This physical contact area separates the liquid flow into droplets which allows the gas to have a bigger area of intimate contact with the liquid. The performance of the device used to provide such surface area of contact is evaluated on such physical basis as the surface area per unit volume, wettability, pressure across the vessel, etc.

It has been suggested that, in the case of distillation, a chemical contribution (e.g. a catalyst) may be used in addition to the physical contribution. However, this strategy has not been applied in the removal of a component or components from a multi-component gas stream. Examples of such multi-component gas streams are combustion flue gases, natural gases, reformate gases, refinery gas, off gases from cement manufacturing, steel making, and the like. In these examples, the components that can be removed include, for example, $CO_2$, $SO_2$, $SO_3$, $H_2S$, and/or $NH_3$.

In the case of combustion flue gases, refinery off gas, and reformate gas, it is known that the production and use of fossil fuels contribute to an increase in emissions of greenhouse gases (GHGs), especially carbon dioxide ($CO_2$) and other pollutants such as oxides of sulfur ($SO_x$), oxides of nitrogen ($NO_x$), hydrogen sulphide ($H_2S$) and hydrogen chloride (HCl). It is desirable to reduce the emissions of $CO_2$ or the other pollutants. Large sources of $CO_2$ emissions such as coal-fired power plants, refineries, cement manufacturing and the like are targeted to achieve these reductions. Thus, intensive research efforts have been made in recent years to develop methods for recovering the $CO_2$ emitted from gas streams from these huge industrial emitters, and for storing the recovered $CO_2$ without discharging it into the atmosphere.

One method of $CO_2$ capture is gas absorption using aqueous amine solutions or ammonia solutions. Typically this method of gas separation technology is used to absorb $CO_2$ from low-pressure streams such as flue gases emitted from power plants. An example of an amine used in this type of process is monoethanolamine (MEA). From a molecular structural standpoint, one of the advantages of using amines is that they contain at least one hydroxyl group, which helps to reduce vapor pressure and thus minimize the losses of the product during hot amine regeneration or $CO_2$ stripping from the amine. Another advantage of using amines is that the presence of the hydroxyl group increases the solubility of the amines in aqueous solutions, thus allowing the use of highly concentrated absorbing solutions. Yet another advantage of using amines is that the presence of the amino group provides the necessary alkalinity to absorb $CO_2$ (Kohl, A. L. and Reisenfeld, F. C., Gas Purification, $4^{th}$ ed., Gulf Publishing Co., Houston, Tex., 1985; Kohl, A. L. and Nielsen, R. B., Gas Purification, $5^{th}$ ed., Gulf Publishing Co., Houston, Tex., 1997). Thus, amines and ammonia have been the solvent of choice for $CO_2$ removal on a commercial scale. In particular, aqueous amine solutions are the widely used solvents for $CO_2$ and $H_2S$ absorption.

For many years, the amine process or the ammonia process for $CO_2$ capture remained unchanged but recently demands to reduce energy consumption, decrease solvent losses, and improve air and water qualities have resulted in several modifications being introduced. For example, in the case of the amine process, specially formulated solvents have been introduced. Depending on the process requirements, for example, selective removal of $H_2S$ and/or $CO_2$-bulk removal, several options for amine-based treating solvents with varying compositions are available. Also, improvements involving the overall integration and optimization of the plant configuration have been suggested. For example, U.S. Pat. No. 6,800,120 (Won et al.) describes a process configuration has been developed that allows the reduction of the heat duty for regeneration. Other improvements on $CO_2$ capture technologies have been highlighted (Yagi et al., Mitsubishi Heavy Industries, GHGT7, Vancouver, 2004) based on solvent improvement, and special design of certain process units. CA 2,685,923 (Gelowitz et al.) describes a number of process configurations as well as a different amine formulation, the combination of which is said to achieve reductions in the heat duty for regeneration.

In a typical system, $CO_2$ capture by absorption using chemical liquid absorbent involves absorbing $CO_2$ from the flue gas stream into the absorbent flowing down from the top of the absorber column counter-currently with the flue gas stream, which flows upwards from the bottom of the column. The $CO_2$ rich liquid from the absorber column is then pumped through the lean/rich exchanger to the top of the stripper column where $CO_2$ is stripped off the liquid by application of steam through a reboiler thereby regenerating the liquid absorbent. The chemical absorption of $CO_2$ into the liquid absorbent in the absorber is exothermic. The stripping of $CO_2$ from the liquid absorbent in the stripper is endothermic and requires external heating. Typically the lowest temperature in the absorber column is around 60° C., which is limited by the temperatures of the lean liquid absorbent and flue gas stream temperatures, and the highest temperature is around 90° C. The typical temperature for stripping or desorption is in the range of 105° C.-150° C. The $CO_2$ desorption process is endothermic with a much higher heat demand than the absorption process can provide thus setting up a temperature mismatch between the absorber and regenerator/stripper. This is one of the reasons that a large amount of external energy is required to induce $CO_2$ stripping in the desorption tower. Since $CO_2$ stripping is part of the $CO_2$ capture process that employs chemical absorption, minimizing this external heat supply would be advantageous.

There has been interest in estimating the heat of chemical absorption of $CO_2$ into liquid absorbents and the heat duty for stripping $CO_2$ from the liquid absorbents for absorbent regeneration. Mechanistic verification would allow modifications to be designed aimed lowering the energy required for activation (e.g. Silva, E. F., Svendsen, H. F., 2006. Study of the Carbamate Stability of Amines using ab initio Methods and Free Energy Perturbations. Ind. Eng. Chem. Res. 45, 2497; Silva, E. F., Svendsen, H. F., 2007. Computational chemistry studies of reactions equilibrium of kinetics of $CO_2$ absorption. International Journal of Greenhouse Gas Control I, 151; Jamal, A., Meisen, A., Lim, C. J., 2006. Kinetics of carbon dioxide absorption and desorption in aqueous alkanolamine solutions using a novel hemispherical contactor-I: Experimental apparatus and mathematical modeling. Chemical Engineering Science 61, 6571; Jamal, A., Meisen, A., Lim, C. J., 2006. Kinetics of carbon dioxide absorption and desorption in aqueous alkanolamine solutions using a novel hemispherical contactor-II: Experimental results and parameter estimation. Chemical Engineering Science 61, 6590). However, there has been limited study of the detailed analysis of the reaction pathway at an atomic level. The structure optimization, energy diagram, and transition-state exploration of the absorption and desorption processes are not clearly understood.

SUMMARY

In this disclosure, we use a combination of computational chemistry methods and experimental thermodynamic analysis to investigate the reaction enthalpy of $CO_2$ absorption for amine-$H_2O$—$CO_2$ systems. We have used this knowledge to generate an accurate free energy diagram of the zwitterion mechanism for $CO_2$ desorption with transition-state exploration, intermediate species structure optimization and analysis. This disclosure provides processes, methods, compositions, devices, and apparatus for the capture of acid gases, such as carbon dioxide ($CO_2$), from flue gas streams, reformate gas streams, natural gas streams, or other industrial gas streams.

DETAILED DESCRIPTION

Figure 1:
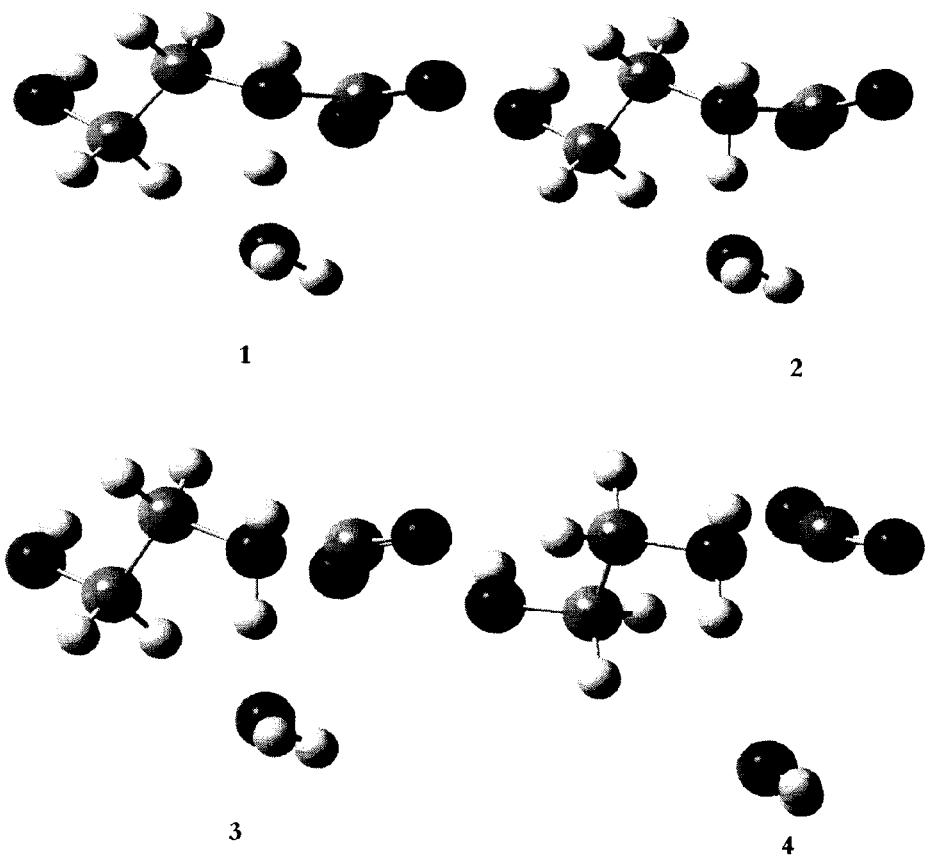
FIG. 1: Simulation of $CO_2$ desorption in the MEA-$CO_2$—$H_2O$ system in the Gaseous Phase using HF/6-31G(d) [1: carbamate, $H^+$, $H_2O$; 2: zwitterions, $H_2O$; 3: N—C stretching in zwitterions, $H_2O$; 4: $CO_2$ dissociates from MEA, $H_2O$]

The present disclosure relates to processes, methods, compositions, devices, and apparatus for the separation of a component or components from a gas stream. The present processes, methods, compositions, devices, and apparatus may provide, for example, improved absorber capture efficiency, increased gas production rate, reduced energy consumption, lower capital costs, and/or lower operating costs. The present processes, methods, compositions, devices, and apparatus are based on the use of catalysts in the absorber and/or the stripper.

Particularly, the present disclosure provides a method for using an alkaline catalyst in the absorber to facilitate acid gas absorption in an absorbent, and/or an acid catalyst in the stripper column to facilitate stripping of the acid gas.

The present disclosure provides a method for employing a solid alkaline catalyst in the absorber to facilitate acid gas absorption by the liquid absorbent, and/or a solid acid catalyst in the stripper column to catalyze stripping.

The present disclosure provides a catalyst, catalytic device, catalytic packing material, catalytic column internals, or the like for separation of a component or components from a mixture of components. The separation may be achieved by any suitable method such as, for example, distillation, absorption, stripping, rectification, desorption, and the like.

The present catalytic process may be used, for example, for removal of a gas component or components (e.g. carbon dioxide ($CO_2$), hydrogen sulfide ($H_2S$), etc.) from multi-component gas streams (e.g. combustion flue gas, reformate gas and natural gas). While not wishing to be bound by theory, it is believed that the presence of the catalyst shifts the separation mechanisms or pathways for the various processes in favor of lower activation energy for separation thereby improving the efficiency of the process. Particularly, the present disclosure provides a method for using an alkaline catalyst in the absorber to facilitate acid gas absorption in the liquid absorbent, and/or an acid catalyst in the stripper column to facilitate $CO_2$ stripping from the liquid absorbent.

The method may lead to cost and process improvements. For example, the external heat requirements for removing an acid gas from a gas stream by an amine-containing liquid absorbent or an ammonia solution may be reduced.

The present disclosure further relates to the development of a catalytically reactive packing material or column internals for separation by catalytic distillation, and/or absorption, and/or stripping, and/or desorption, and/or rectification, and/or removal of a gas component or components from a multi-component gas stream.

As used herein, the term 'absorption media' and 'adsorption media' refers to media that can absorb/adsorb an amount of acid gas.

As used herein, the term 'rich absorption and/or adsorption media' refers to media that has absorbed/adsorbed an amount of acid gas relative to lean media.

As used herein, the term 'lean absorption and/or adsorption media' refers to media that has no or low amounts of acid gas.

Absorption/adsorption media that may be used herein include monoethanolamine (MEA), diglycolamine (DGA), diethanolamine (DEA), methyldiethanolamine (MDEA), 2-amino-2-methyl-1-propanol (AMP), piperazine (PZ), ammonia, amines, alkanolamines, amino alcohols, diamines, ionic liquids, aminosilicone, derivatives and/or combinations thereof.

As used herein, the term 'acid gas' refers to gases that form acidic solutions when mixed with water. Examples of acid gases include carbon dioxide ($CO_2$), sulphur dioxide ($SO_2$), sulphur trioxide ($SO_3$), hydrogen sulphide ($H_2S$), hydrogen chloride (HCl), and oxides of nitrogen ($NO_x$).

As used herein, the term 'acid catalyst' refers to proton donor (Brønsted acid) catalysts, electron acceptor (Lewis acid) catalysts, and combinations thereof. Any suitable acid catalyst may be used herein. For example, the catalyst may be a proton-donating catalyst, or an electron-acceptor catalyst. Preferred catalysts are proton-donators. Examples of acid catalysts include, but are not limited to, $FeCl_3$, $SbF_5$ and $AlCl_3$ supported on graphite, $Al_2O_3$, $SiO_2$, zeolites, & clays (e.g. $AlCl_3/Al_2O_3$, $ZnCl_2$/Acid treated clays, $FeCl_3$/graphite, $SbF_5$/graphite, $AlCl_3$/graphite, vanadium phosphates and aluminophosphates, $CaO$—$ZrO_2$; $Sm_2O_3$—$ZrO_2$; $Yb_2O_3$—$ZrO_2$, aluminum chlorofluoride, ACF, ($AlCl_xF_{3-x}$, $x\approx0.05$-$0.25$), aluminum bromofluoride, ABF, ($AlBr_xF_{3-x}$, $x\approx0.05$-$0.25$)); heteropoly acids (HPAs) such as $H_3PW_{12}O_{40}$ and $H_3PMo_{12}O_{40}$; silica-supported Nafion (SAC-13); alumina, amorphous silica-alumina, amorphous silica-alumina molecular sieves such as microporous aluminosilicates or zeolites (e.g. HZSM-5, H—Y, H—X) and mesoporous aluminosilicates such as M41S (e.g. MCM-41, SBA-15, MCF); silica-magnesia, silica-zirconia, alumina-boria, titania-boria, tungstate-alumina, and tungstate zirconia; $AlCl_3$/mesoporous silica, $CrO_x/ZrO_2$, sulfated zirconia, pillared clays (PILC) and acidic porous clay heterostructures (PCH).

Any suitable Brønsted acid catalyst may be used herein. For example, amorphous silica-alumina molecular sieves such as microporous aluminosilicates or zeolites (e.g. HZSM-5, H—Y, H—X) and mesoporous aluminosilicates such as M41S (e.g. MCM-41, SBA-15, MCF); heteropoly acids (HPAs) such as $H_3PW_{12}O_{40}$ and $H_3PMo_{12}O_{40}$; silica-supported Nafion (SAC-13), and combinations thereof.

Any suitable Lewis acid catalyst may be used herein. For example, $FeCl_3$, $SbF_3$ and $AlCl_3$ supported on graphite, $Al_2O_3$, $SiO_2$, zeolites, & clays (e.g. $AlCl_3/Al_2O_3$, $ZnCl_2$/Acid treated clays, $FeCl_3$/graphite, $SbF_5$/graphite, $AlCl_3$/graphite, vanadium phosphates and aluminophosphates, $CaO$—$ZrO_2$; $Sm_2O_3$—$ZrO_2$; $Yb_2O_3$—$ZrO_2$, aluminum chlorofluoride, ACF, ($AlCl_xF_{3-x}$, $x\approx0.05$-$0.25$), aluminum bromofluoride, ABF, ($AlBr_xF_{3-x}$, $x\approx0.05$-$0.25$), and combinations thereof.

Any suitable mix of Brønsted acid catalyst and Lewis acid catalyst may be used herein. For example, alumina, amorphous silica-alumina, amorphous silica-alumina molecular sieves, silica-magnesia, silica-zirconia, alumina-boria, titania-boria, tungstate-alumina, and tungstate zirconia; $AlCl_3$/mesoporous silica, $CrO_x/ZrO_2$, sulfated zirconia, pillared clays (PILC) and acidic porous clay heterostructures (PCH).

As used herein, the term 'alkaline catalyst' refers to proton acceptor catalysts, electron donor catalysts, and combinations thereof. Any suitable alkaline catalyst may be used herein. For example, electron-donating (Lewis base) catalysts may be used. Examples, of alkaline catalysts include, but are not limited to, $Na/NaOH/Al_2O_3$, Quaternary ammonium functionality supported over a resin (A26), Quaternary ammonium salt functionalized silica gel ($QN^+OH^-/SiO_2$), ZnO, $ZrO_2$, $ThO_2$, $TiO_2$, CaO, MgO, SrO, BaO; Na metal dispersed on $Al_2O_3$, Na/MgO, $La_2O_3$, $Y_2O_3$, alkali metal oxides, alkali metal ions on alumina ($K^+/Al_2O_3$; $Na^+/Al_2O_3$), alkali metal ions on silica ($K^+/SiO_2$; $Na^+/SiO_2$), alkali metal on alkaline earth oxide (Na/MgO), alkali metals and alkali metal hydroxides on alumina ($Na/NaOH/Al_2O_3$), clay minerals (such as hydrotalcite, chrysotile, sepiolite), non-oxide, KF supported on alumina, lanthanide imide and nitride on zeolite, and combinations thereof.

Any suitable electron-donating catalyst may be used herein. For example, Na metal dispersed on $Al_2O_3$, Na/MgO, and combinations thereof.

The present technology may be used in a variety of situations. For example, in the treatment of exhaust gases from electric power generating plants; exhaust and off gases from breweries and ethanol plants; exhaust and off gases from cement manufacturing plants; refinery off gases; reformate gas or product gas mixture from reforming plants to produce hydrogen; biogas; combustion flue gas to produce steam for steam assisted gravity drainage (SAGD) operations for crude oil and oil sands production; natural gas processing.

The present catalyst may be presented in any suitable form. For example, in the form of (a) pellets (cylinders, spheres, random shapes, etc.) in the stripper or absorber, (b) sprayed on typical absorber or stripper internals (structured packing, random packing, trays, etc.), (c) coated on typical absorber or stripper internals (structured packing, random packing, trays, etc.), (d) in a honey-comb style in the absorber or stripper, (e) in the form of pellets (cylinders, spheres, random shapes, etc.) or sprayed or coated on the inside of pipes or on pipe internals (packing) or in a honey-comb style in the pipe carrying the loaded amine from the lean-rich exchanger or cross flow heat exchanger (but after the heat exchanger) to the stripper, (f) in the same manner as in (e) of any pipe carrying heated or hot rich amine, (g) in the form of pellets (cylinders, spheres, random shapes, etc.) on the amine side of the reboiler or sprayed or coated on tubes on the amine side of the reboiler.

The present disclosure provides a process for separating at least a portion of an acid gas (e.g. $CO_2$) from a gaseous mixture, said process comprising:

(a) contacting the gaseous mixture with an absorption medium and/or adsorption medium, wherein said medium absorbs and/or adsorbs at least a portion of the acid gas to form a rich medium; and (b) separating at least a portion of the acid gas from the rich medium to form a lean medium; wherein the separation step is performed using an acid catalyst, a proton-donating catalyst, an electron withdrawing catalyst, or a combination thereof.

The present disclosure provides a process for separating at least a portion of an acid gas (e.g. $CO_2$) from a gaseous mixture, said process comprising:

(a) contacting the gaseous mixture with an absorption medium and/or adsorption medium, wherein said medium absorbs and/or adsorbs at least a portion of the acid gas to form a rich medium; and (b) separating at least a portion of the acid gas from the rich medium to form a lean medium; wherein the absorption/adsorption is performed using an alkaline catalyst, an electron donating catalyst, or a combination thereof.

The present disclosure provides a process for separating at least a portion of an acid gas (e.g. $CO_2$) from a gaseous mixture, said process comprising:

(a) contacting the gaseous mixture with an absorption medium and/or adsorption medium, wherein said medium absorbs and/or adsorbs at least a portion of the acid gas to form a rich medium; and (b) separating at least a portion of the acid gas from the rich medium to form a lean medium; wherein the absorption/adsorption is performed using an alkaline catalyst, an electron donating catalyst, or a combination thereof; and the separation is performed using an acid catalyst, a proton-donating catalyst, an electron withdrawing catalyst, or a combination thereof.

Post combustion capture of $CO_2$ from flue gases using amines was examined. The requirement for a large external heat supply during amine-based post combustion capture in order to strip $CO_2$ from loaded amine and the need for a taller column for $CO_2$ absorption can be illustrated in an energy diagram constructed to show $CO_2$ absorption in a lean amine and $CO_2$ stripping from $CO_2$ loaded amine solution. The postulated mechanism of $CO_2$ absorption and desorption is based on the so-called "Zwitterion mechanism" proposed by Caplow in 1968. This is considered to be a two-step mechanism (Equations 1 and 2) for both absorption and desorption. These steps are two reversible reactions and one short-lived intermediate. In the absorption process or "carbamate formation" (i.e. from left to right), the steps are a zwitterion formation and a deprotonation. In the desorption process or "carbamate breakdown" (i.e. from right to left), the steps are a proton-transfer process and a N—C bond breaking process. These two reactions can be expressed in reactions (1) and (2).

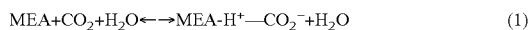

$$MEA + CO_2 + H_2O \leftrightarrow MEA\text{-}H^+\text{---}CO_2^- + H_2O \quad (1)$$

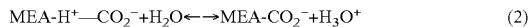

$$MEA\text{-}H^+\text{---}CO_2^- + H_2O \leftrightarrow MEA\text{-}CO_2^- + H_3O^+ \quad (2)$$

It has been suggested (Crooks, J. E., Donnellan, J. P., 1989. Kinetics and Mechanism of Reaction Between Carbon Dioxide and Amine in Aqueous Solution. J. Chem. Soc. Perkins. Trans., II, 331) a one-step mechanism of carbamate formation (Equation 3). It should be noted that for absorption, the one-step and two-step mechanism of $CO_2$ absorption are not contradictory. Based on the zwitterion mechanism, the first slow step of the zwitterion formation is the rate determining step which facilitates the subsequent deprotonation step. The second step thus occurs automatically and rapidly such that the total absorption process can be regarded as one-step.

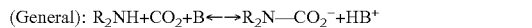

(General): $R_2NH + CO_2 + B \leftrightarrow R_2N\text{---}CO_2^- + HB^+$

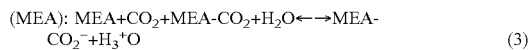

(MEA): $MEA + CO_2 + MEA\text{-}CO_2 + H_2O \leftrightarrow MEA\text{-}CO_2^- + H_3^+O \quad (3)$ In contrast, the Zwitterion mechanism of $CO_2$ desorption would need to be a two-step mechanism. The present disclosure reproduces the desorption process in the gaseous phase using the Hartree-Fock theory (HF/6-31 G(d) method) optimizing for the reaction between carbamate and $H_3O^+$. As used in this context, optimization means molecular structural geometry optimization designed to locate the energy minima on a potential energy surface for the purpose of predicting the equilibrium structures of molecular systems. Since cations and anions have very high energy in the gaseous phase, there is no transition state during the desorption process and the reaction occurs automatically. FIG. 1 represents the intermediate converging process in the gas phase. It represents $CO_2$ desorption in the gas phase using the zwitterion mechanism i.e. via a two-step pathway from (i) proton transfer to N—C bond breaking.

Figure 2:
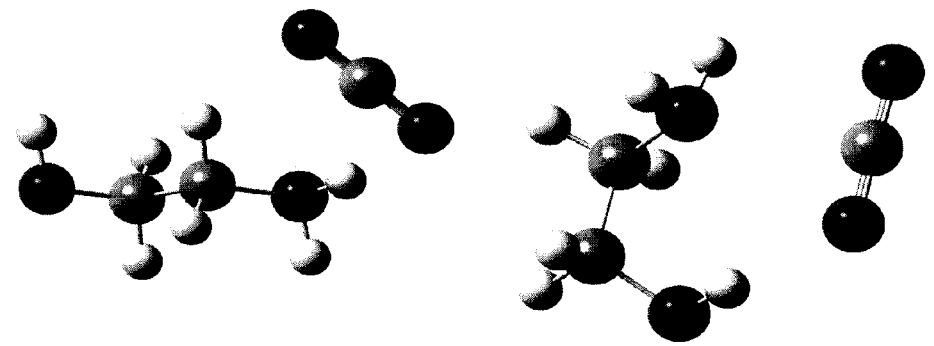
FIG. 2: Detailed linear (left hand side) and circular (right hand side) structures of the reactants (MEA-$CO_2$), reaction intermediate (zwitterion), and products (MEA+$CO_2$) for $CO_2$ desorption.
Figure 2:
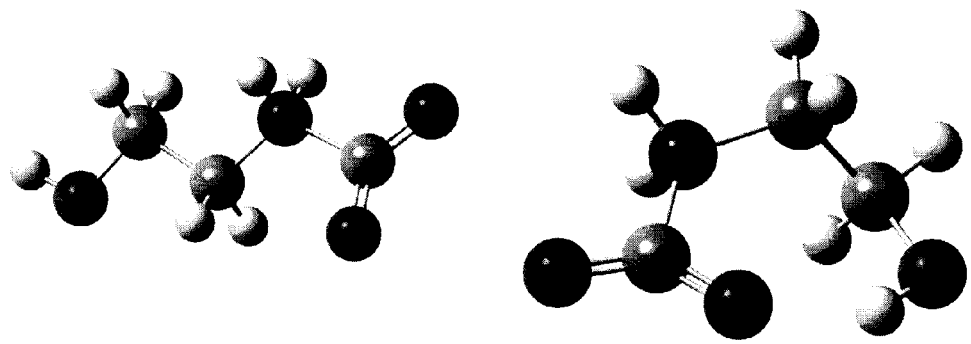
Figure 2:
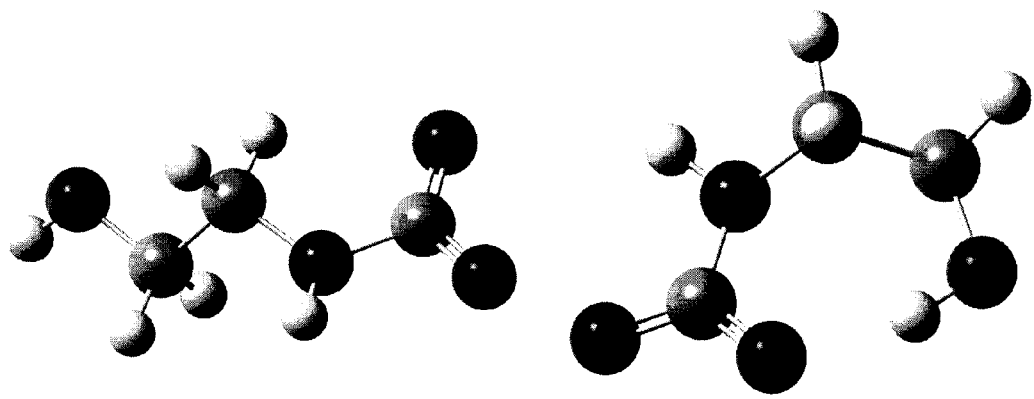

The structure of $MEA+CO_2$, Zwitterions and carbamate was optimized based on the Zwitterion mechanism, as shown in FIG. 2. This detailed structure analysis was used to evaluate the applicability of the mechanism. On the basis of this optimization analysis, it was found that the molecular orbital hybridization of the nitrogen atom in the three species was quite different; the N atom is $sp^3$ hybridized in MEA and Zwitterions, but is $sp^2$ hybridized in the carbamate. This suggests a change in molecular structure when a carbamate evolves into a zwitterion. A detailed comparison of the structures in terms of N—C and C—O bond lengths was performed (Table 3).

TABLE 3

Linear and Circular Structures of the Reactant, Product and Reaction Intermediates for the Zwitterion

| | Linear structure[b] (Å) | | | Circular structure (Å) | | |
|---|---|---|---|---|---|---|
| Bond Length | $R_{N-C}$ | $R_{C-O}$ | $R_{C-O}$ | $R_{N-C}$ | $R_{C-O}$ | $R_{C-O}$ |
| MEA + $CO_2$ | — | 1.143 | 1.143 | — | 1.143 | 1.143 |
| Transition State | 1.926 | 1.173 | 1.173 | 1.930 | 1.173 | 1.173 |
| Zwitterion ($sp^3$) | 1.553 | 1.208 | 1.211 | 1.554 | 1.206 | 1.212 |
| Zwitterion ($sp^2$) | 1.450 | 1.227 | 1.230 | 1.438 | 1.226 | 1.239 |
| MEA-CO2- | 1.395 | 1.242 | 1.245 | 1.388 | 1.240 | 1.251 |
| MEA-COOH | 1.337 | 1.208 | 1.326 | 1.332 | 1.213 | 1.321 |

[a]All the structures were optimized with HF/6-31G(d) with CPCM solvent shell except that Zwitterion ($sp^2$) is the starting geometry.
[b]The detailed structures are illustrated in FIG. 2.

In the optimized structures of MEA and $CO_2$, the normal N—C bond length in MEA was 1.45 Å with nitrogen being $sp^3$ hybridized, while the C—O bond length was 1.14 Å and was sp hybridized. The N—C bond in MEA is a single bond, while the C—O bond is between a double bond and a triple bond. In the optimized structure of a carbamate, the N—C bond in contact with $CO_2$ was shortened to 1.395 Å while the C—O bond was stretched to 1.24 Å; both bonds are approximate to double bonds. The averaged bond lengths are due to the de-localized conjugation. The N atom of the carbamate is $sp^2$ hybridized; N, C with two O atoms that are almost arranged in one-plane. The lone pair 2p orbital of nitrogen conjugates with the 2p orbital of C and O atoms. Four 2p orbitals stand perpendicular to the plain, and then generate a huge de-localized π bond over N, C and two O atoms. This conjugation structure stabilizes the carbamate and improves the absorption ability of MEA.

The optimized structure of the Zwitterion is quite different from that of the carbamate. In the optimized structure of the zwitterion, the N atom is $sp^3$ hybridized, with the N—C bond stretched to 1.55 Å and C—O bond shortened to 1.21 Å which indicates that the conjugation is broken and the structure is closer to $MEA+CO_2$ than the carbamate. The proton transfer breaks the conjugation of the carbamate not only by switching from $sp^2$ to $sp^a$ formation, but also, by lengthening the N—C bond to weaken the bong strength. Thus the proton greatly facilitates $CO_2$ stripping by promoting the second $CO_2$ desorption step (i.e. N—C bond breaking). Therefore proton transfer appears to be indispensable for $CO_2$ desorption (carbamate breakdown).

Figure 3A:
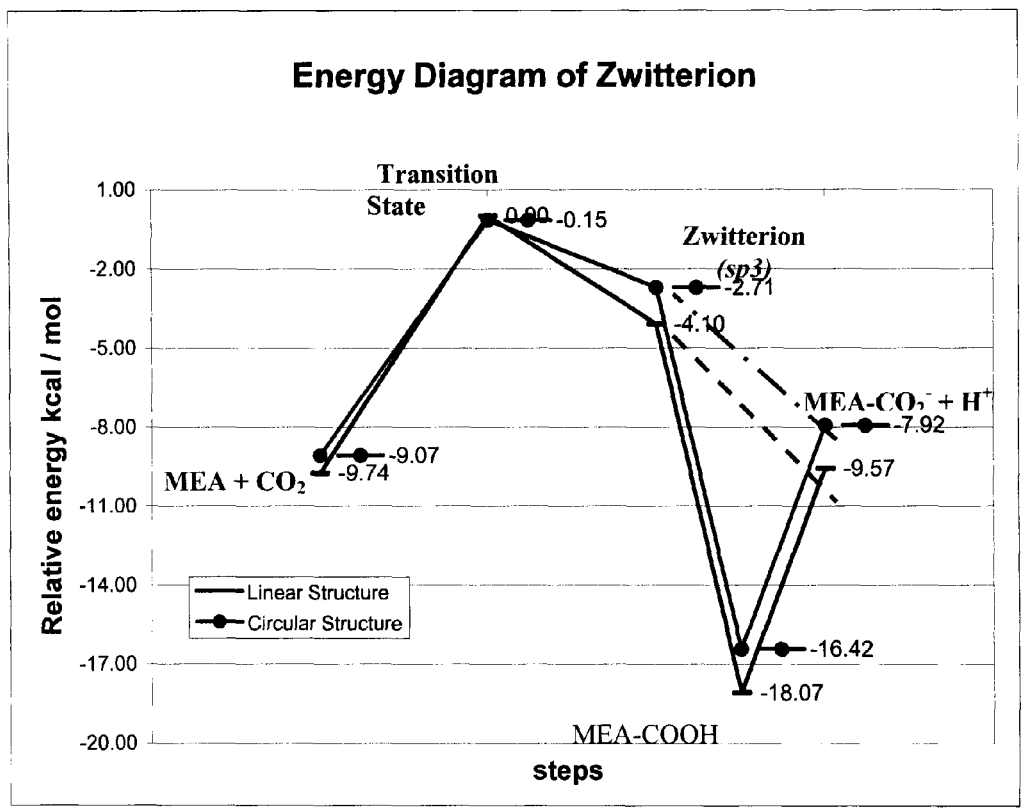
FIG. 3a: Relative (kcal mol$^{-1}$) Energy Diagram of the Zwitterion Mechanism Showing Two Possible Structures.
Figure 3B:
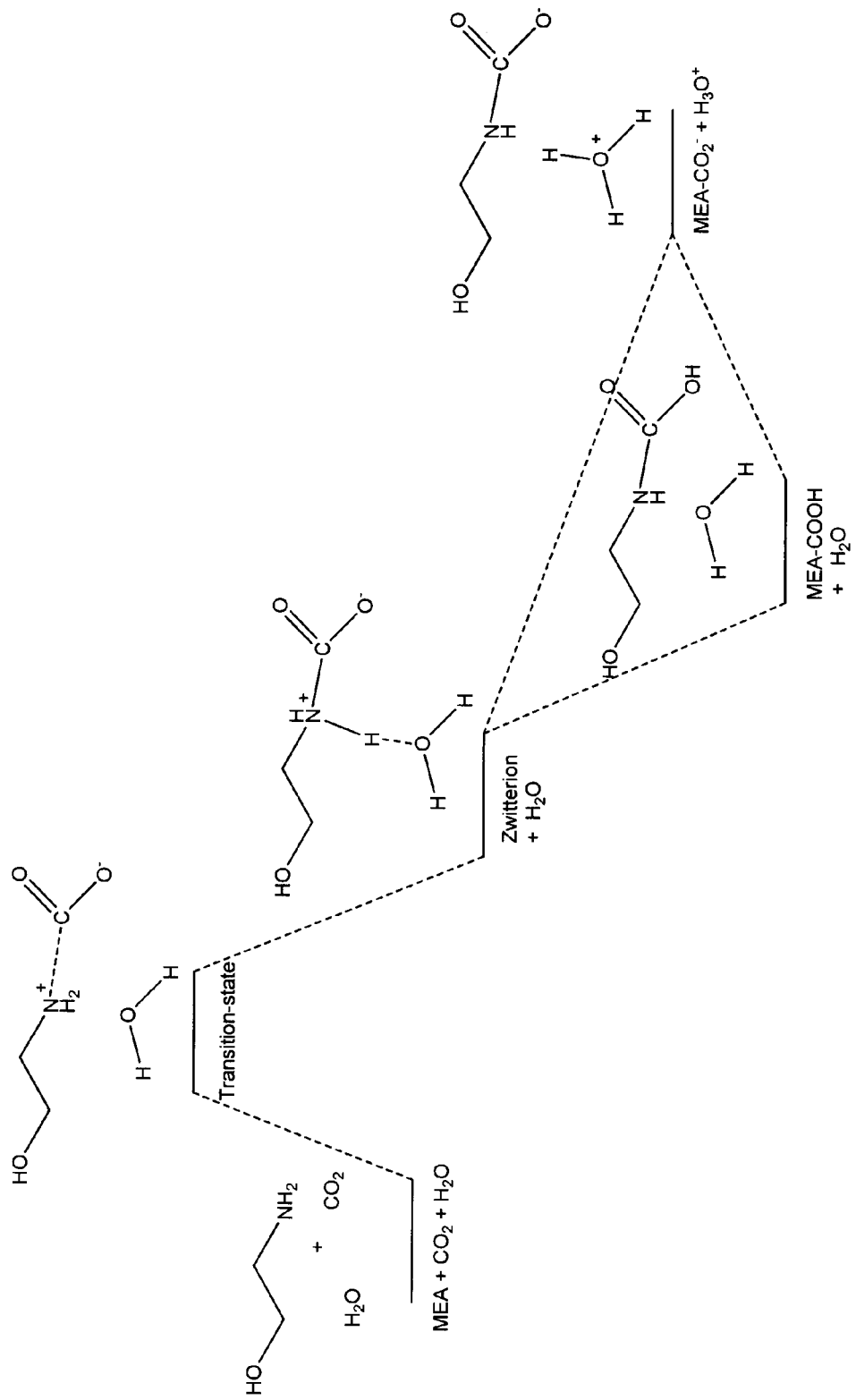
FIG. 3b: Detailed reaction pathway of the Zwitterion mechanism from reactants through intermediates to products corresponding to the energy diagram of FIG. 3a for the linear case.

The energy associated with proton transfer was estimated in order to estimate the contribution of the proton for stripping. Since the Zwitterion is a short-live intermediate, it is challenging to estimate the enthalpy experimentally hence computational methods were applied. Reaction (2) has a charge separation issue. Also, the computed energy of carbamate+$H_3O^+$ is even higher than the Zwitterion, which would contradict experimental observations. Thus, this cannot be calculated directly.

that $CO_2$ stripping (reaction 1) involves the breaking of the N—C bond, allowed the calculations to be started with the stretching of the N—C bond. Then the transition state with (HF) was explored by applying HF/CPCM 6-31 G(d) level of theory. The detailed structures (for the linear case) are shown in FIG. 3b, and the energies are as listed in Table 4.

TABLE 4

Total (Hartree) and Relative (kcal mol$^{-1}$) of Energies of the Stationary Points of Carbamate, Intermediates and Transition States for Two Structures; solvent continuum ($\epsilon$ = 78.3), with CPCM methods

|  | Linear [a] | | Circular | |
| --- | --- | --- | --- | --- |
|  | HF/CPCM 6-31G(d) | DFT/CPCM 6-31G(d) | HF/CPCM 6-31G(d) | DFT/CPCM 6-31G(d) |
| Intermediates | | | | |
| MEA + $CO_2$ | −396.7526219 | | −396.7515519 | |
| Transition State | −396.7370959 | | −396.7373374 | |
| Zwitterion (sp3) | −396.7436287 | | −396.7414147 | |
| MEACOOH | −396.7658970 | | −396.7632555 | |
| MEA-$CO_2^-$ + $H_3O^+$ | / | / | / | / |
| Relative Energies [b] | | | | |
| MEA + CO2 | −9.74 | | −9.07 | |
| Transition State | 0 | | −0.15 | |
| Zwitterion (sp3) | −4.10 | | −2.71 | |
| MEACOOH | −18.07 | | −16.42 | |
| MEACOOH + $H_2O$ → MEA-$CO_2^-$ + $H_3O^+$ [c] | 7.8-9.2 (8.5) [d] | | 7.8-9.2 (8.5) [d] | |
| MEA-$CO_2^-$ + $H_3O^+$ | −9.57 | | −7.92 | |
| Ea [e] (Calc) | 9.57 | | 7.92 | |
| Ea [e] (exp) | 13.65 [f]; 9.87 [g] | | | |

[a] The detailed structure is illustrated in FIG. 2.
[b] We set the transition state of linear structure at zero for the respective level of theory
[c] Reaction enthalpy of carbamate and proton is hard to estimate by experiments because decarboxylation of carbamate will occur spontaneously with excess protons.
[d] We took 8.5 kcal mol$^{-1}$ as the average value of reaction energy because most acid ionization constants Ka of carboxyl acids fall within range of 10$^{-4}$ to 10$^{-5}$. Based on pKa, we can calculate free energy ΔG. (Brown and Foote. 2002, Organic Chemistry 3$^{rd}$ Ed, Harcourt College Publishers, Orlando, Fl.)
[e] The computational activation energy of $CO_2$ desorption under Zwitterion mechanism is the energy difference between transition state and carbamate + $H_3O^+$ as shown in FIG. 3a.
[f] The latest experimental value of $CO_2$ desorption is given by Jamal et al., 2006b.
[g] The older experimental value from Rinker et al., 1996.

In order to estimate the energy required for the proton transfer that is necessary for stripping, a short-live intermediate MEACOOH (carboxyl acid) was induced to create a reaction circle as presented in reactions (4) and (5). The energy of reaction (4) was then calculated and the reaction free energy (ΔG) of reaction (5) was estimated. The free energy (ΔG) of reaction step 5 is difficult to determine experimentally or computationally because of charge separation issues. This free energy was estimated based on the fact that the ionization constant, Ka, of most carboxyl acids for such types of reactions fall in the range of 10$^{-4}$-10$^{-5}$. Then, the free energy (ΔG) falls in the range of 7.8 to 9.2 kcal/mol (Brown and Foote, 2002). In the case of reaction step 5, the average value of 8.5 kcal/mol was used. Then, the free energy of reaction (2) becomes the algebraic sum of reactions 4 and 5. The optimized structure is shown in FIGS. 3a-b and the computational data of the reaction pathway given in the energy diagram are shown in Table 4.

MEA-H$^+$—$CO_2^-$ ↔ MEA-COOH    (4)

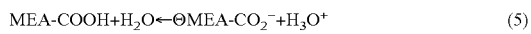

MEA-COOH+$H_2O$ ↔ MEA-$CO_2^-$+$H_3O^+$    (5)

In constructing the energy diagram in FIG. 3, it was attempted to obtain the true transition state as the basis for all computations from among possibilities. The realisation The data in Table 4 and FIG. 3 show that the total activation energy, E=E(TS)+ΔH1+ΔH2(exp) is about 10 kcal mol$^{-1}$. This value matches those reportedly observed experimentally 13.65 and 9.87 kcal mol$^{-1}$ (Jamal, A., Meisen, A., Lim, C. J., 2006. Chemical Engineering Science 61, 6590; Rinker, E. B., Ashour, S. S., Sandall, O. C., 1996. Kinetics and modeling of carbon dioxide absorption into aqueous solutions of diethanolamine. Industrial Engineering Chemistry Research 35, 1107). The Zwitterion is a short lived intermediate for which the activation energy of desorption in the system should be the total desorption process of reactions (1) and (2) rather than only reaction (1).

It is clear from FIG. 3 that the short lived Zwitterion is very unstable and disappears very quickly. The proton transfer goes backward to attach to MEA more easily rather than generating zwitterions. Also, even if the Zwitterion is generated, it still requires some energy to overcome the energy barrier. Theoretically, the zwitterions would prefer to strip protons rather than break into MEA and $CO_2$, according to the potential energy surface diagram. This scenario creates difficulty in desorbing $CO_2$ from the absorbent without an external energy supply.

It appears a major reason for the difficulty in desorbing $CO_2$ from MEA loaded solution is the deficiency of protons.

The MEA-H$_2$O—CO$_2$ solution has a pH value of 7-8 wherein limited liberated protons exist. Thus, the concentration of H$_3$O$^+$ is extremely low. The shortage of protons means desorption is unlikely to occur (estimated at one chance in 1-10 million). Attempting to resolve these deficiencies results in the requirement for a large heat duty for CO$_2$ desorption.

While not wishing to be bound by theory, the present disclosure suggests that CO$_2$ desorption would be increased if the energy of the zwitterion was lowered and/or if the new zwitterion was stabilized. For example, this might be achieved by introducing a proton such as H$_3$O$^+$ into the solution. One method of introduces a proton that will react with the carbamate to facilitate CO$_2$ desorption would be to use an acid catalyst. Conversely, an alkaline catalyst would facilitate CO$_2$ absorption. In summary, the energy diagram analysis suggests that the instability and short-live intermediate Zwitterion and/or a shortage of proton in solution may be at least partially the cause of the requirement of an external heat supply for the CO$_2$ desorption process. Based on the proposed energy diagram, carbamate breakdown via Zwitterion mechanism may utilize a proton-donating catalyst (e.g. Bronsted acid) to reduce the external heat requirement. On the absorption side, a Lewis base (electron donor) may facilitate CO$_2$ absorption.

Figure 4:
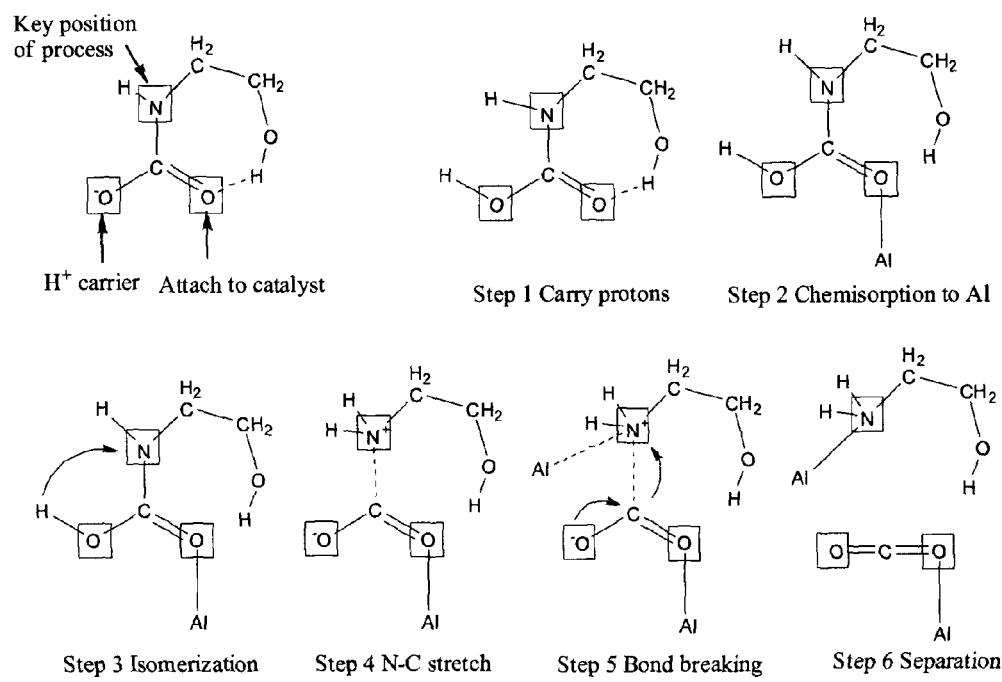
FIG. 4: Overall $CO_2$ desorption mechanism with Solid Acid (e.g. Al) catalyst.
Figure 5:
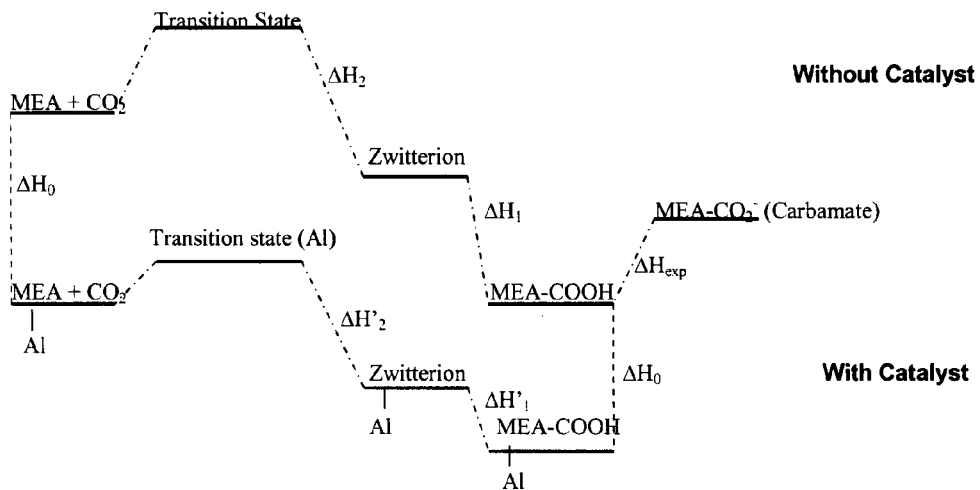
FIG. 5: The reaction pathway for desorption of $CO_2$ (carbamate breaking) over a solid acid catalyst-comparison of energy between catalytic and non-catalytic approaches.
Figure 5:
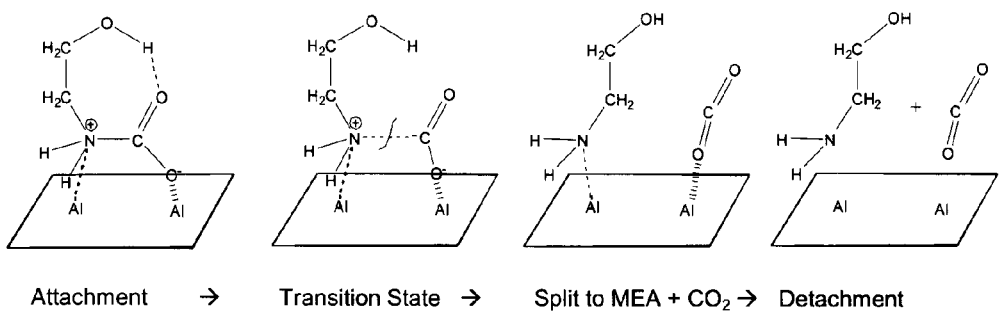

CO$_2$ Desorption with a solid acid catalyst (Al Based Catalyst) was analysed. A computational simulation for MEA-COOH with Al(OH)$_3$ was performed with DFT/6-31 g(d) level of theory with CPCM model. Three calculations were performed separately with the Al placed next to the N atom on (N—H), O atom on (O—H), and the other O atom, respectively. The results of these three sets of data show that the stability of the complex decreases in the order of O—Al>(OH)—Al>(NH)—Al (FIG. 4). FIG. 4 shows that the N—Al connection is relatively weaker than O—Al bond since the N is saturated with three valance bonds (sp$^2$ hybridization) and the lone pair 2p orbital was already involved in the conjugation. However, the oxygen atom has a lone pair of orbitals in the N—CO$_2$ plane, which can bond to the Al easily. The 0 in (OH) is a weaker Lewis base than the oxygen (O) as shown by the computational data. This means that MEA-COOH will attach to catalyst at the third oxygen atom (O). The third oxygen has 3 advantages in the catalysis: 1) most likely to attach to Al (good capability of chemical absorption); 2) most stable configuration; 3) least stereo hindrance in both linear and circular structure because it is located at the end of the linear structure and outside the ring (FIG. 4). Further simulation can estimate the energy difference between MEA-COOH—Al(OH)$_3$ and Zwitterion-Al(OH)$_3$ with same level of theory. The Al atom is attached to the third oxygen. The energy difference is about 5.4 kcal/mol, which is about 35% less than the difference without catalyst 8.5 kcal/mol (FIG. 5). Therefore, the catalyst may help to reduce the reaction enthalpy for proton transfers by stabilizing the short-live intermediate Zwitterion.

Based on FIG. 4, three potential active sites were identified on the carbamate. The N and two oxygen atoms are Lewis base sites. These three atoms (sites) may be used to facilitate CO$_2$ desorption via the following steps:

Step 0: Based on the structure of carbamate, the N atom is the key position for the CO$_2$ desorption process since desorption will not proceed unless the N—C bond breaks. The 0 anion is a very good proton carrier, which can take a proton from an acid catalyst (e.g. HZSM-5 catalyst) layer into the Al layer. The third 0 is a good catalyst attachment center. The challenge is then to apply proper catalysis procedure to take advantage of these centers, so as to facilitate desorption.

Step 1: Carry Protons. The carbamate passes through HZSM-5 layer, over 50% of carbamate will carry the protons and convert to MEA-COOH. These protons are very useful for desorption.

Step 2: Chemisorption. The MEA-COOH reaches the Al layer. After external and internal mass transfer, MEA-COOH attaches to the surface. O atom bonds to Al as chemisorption takes place.

Step 3: Proton Transfer. The H on the oxygen dislocates the 0 and shifts to the neighbouring N atom to construct Zwitterion. This is a slow endothermic reaction. Zwitterion-Al is still not stable but is better than Zwitterion without catalyst.

Step 4: N—C stretch. The H destroys the de-localized conjugation and N—C bond starts to stretch.

Step 5: Bond breaking. The second Al attaches to N$^+$ and helps to stretch the N—C bond to facilitate desorption. The competition between the bond of Al—N with N—C may be important. This is also a slow, endothermic rate determining step (RDS) process. It is hard to go forward because the Al is unlikely to attach to N$^+$ cation. However, since the N—C bond is weak and the N is neutral, and therefore, the connection is much stronger. This step is also the major difference between the catalyst mechanism and non-catalyst mechanism. Without an acid catalyst, the N—C bond breaking relies only on external heat supply. However, with an acid catalyst, the chemical bond helps as an additional molecular force to pull the N—C bond. This sequence is shown in FIG. 5 which also compares the energy diagrams between the catalytic and non-catalytic approaches.

Step 6: Separation. N—C bond finally breaks and the Zwitterion splits into MEA and CO$_2$. Since the solubility of CO$_2$ in hot water is low, the CO$_2$ will detach from the catalyst easily and go to the gaseous phases readily. The desorption temperature may be in the range from 50 to 120° C. An increase in T increases the reaction speed, helps the CO$_2$ to detach from the catalyst as well as facilitate N—C bond breaking. Also, it weakens the attachment of MEA-COOH to catalyst. However, there is a cost attached to a high temperature heat supply. Therefore, the temperature for heat supply needs to be optimized to control the energy cost.

Solid Base or Alkaline Catalyst for Absorption—From the reaction CO$_2$+2 MEA→MEA-H$^+$+MEA-COO$^-$, the MEA-H$^+$ will stay in the solution (H+ is from the N—H bond in another MEA when it converts to the carbamate). MEA-H$^+$ is not involved in the desorption process but it has low capability to absorb CO$_2$ since the N is attached to a proton. Therefore, MEA-H$^+$ has to be converted to MEA to absorb CO$_2$ continuously. Conventional methods do not require this step because the higher T and heat duty would have already stripped MEA-H$^+$ to MEA. Since the energy cost is saved, the mass cost cannot be neglected.

EXAMPLES

Examples of Experiments Performed to Evaluate the Contribution of Acid Catalysts in CO$_2$ Stripping Batch Tests on Catalytic Desorption of CO$_2$ from CO$_2$-Loaded MEA Solution Several batch tests were performed on CO$_2$-loaded MEA solution with different types of solid acid catalysts to obtain information on their effectiveness and efficiency for CO$_2$ stripping. Two types of catalysts were used; a proton donor (Bronsted acid; e.g. H-ZSM-5) catalyst and an electron acceptor (Lewis acid; e.g. γ-Al$_2$O$_3$) catalyst.

Figure 6:
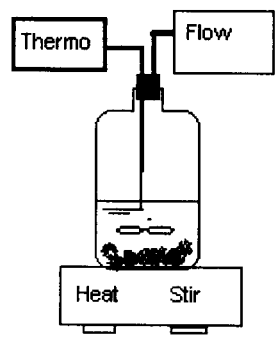
FIG. 6: Experimental apparatus for Batch $CO_2$ desorption from $CO_2$ Loaded Amine Solution.

Experimental Setup:

The set up for the batch experiments is as shown in FIG. 6. It consists of a heater and stirrer, a magnetic stirrer, a 600 mL glass bottle, a thermocouple, a CO$_2$ gas mass flow meter (0-5 L/min), rubber cock, parafilm and tubing.

Materials and Chemicals:

The experiments were conducted using MEA (commercial grade, 99% purity) with molarity in range of 3-7 mol/L, CO$_2$ loading in the range of 0.25-0.58 mol CO$_2$/mol MEA, temperature in the range of 50-92° C., two catalysts; namely H-ZSM-5 and γ-Al$_2$O$_3$, and catalyst quantities of H-ZSM-5: 25.0-65.0 g; γ-Al$_2$O$_3$ 25.0-50.0 g. The H-ZSM-5 and γ-Al$_2$O$_3$ (commercial grade 99% purity) were sieved into approximately 2 mm average particle size.

Figure 7:
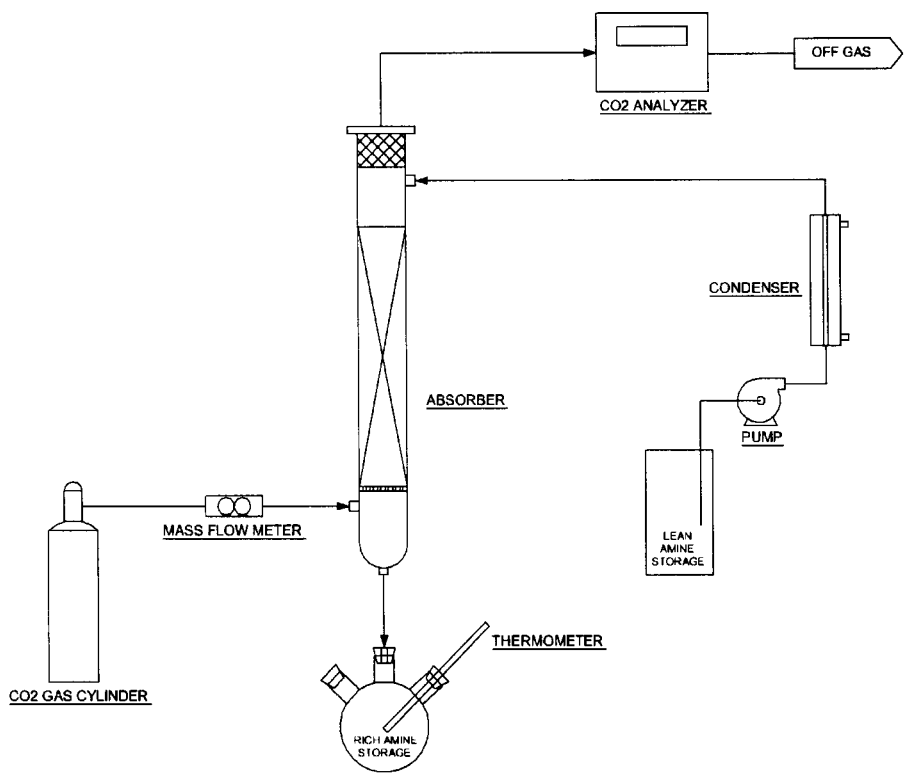
FIG. 7: Experimental Setup to Test the Effect of Solid Alkaline Catalysts for $CO_2$ Absorption.

Typical Experimental Run:

About 300 ml of the desired molarity of aqueous MEA solution was prepared and placed in the bottle containing the desired weight of the 2 mm particle size catalyst. The bottle also contained the magnetic stirrer. The glass bottle was sealed with the rubber cock, which carried the thermocouple and rubber tubing. The rubber tubing was connected to the CO$_2$ gas mass flow meter as shown in FIG. 7. Firstly, both the stirrer and the heater were turned on. Evolution of CO$_2$ started as the temperature of the amine solution increased from room temperature to about 92° C. The CO$_2$ flow rate was measured with the gas flow meter while temperature was measured with a thermocouple. The first data of CO$_2$ flow rate was recorded at 50° C., and then subsequently every 5° C. until the system reached 92° C.

Experimental Apparatus.

A Desorption (Batch reactor) was shown in FIG. 6.

Examples of Experiments Performed to Evaluate the Contribution of Basic or Alkaline Catalysts in CO$_2$ Absorption Semi-Batch Tests on Catalytic Absorption of CO$_2$ in CO$_2$-Lean MEA Solution Several sets of tests were performed on lean MEA solution with solid base catalysts to evaluate their performance in terms of efficiency and kinetics. MgCO$_3$ (5.0 to 15.00 g) was used as an example of the solid base or alkaline catalyst that can accelerate CO$_2$ absorption as compared to conventional absorption (i.e. non-catalytic absorption).

Experimental Set-Up

The experimental set-up was as shown in FIG. 7. The apparatus consisted of a centrifuge pump, mass flow meter, a K-type gas cylinder with regulator, a 600 mL beaker, a 500 mL three-neck round glass bottle, a glass condenser (12/20 type), another glass condenser used as an absorption column (internal diameter ⅝ inch, 24/40 type), several glass vacuum adaptors (connectors and angles of 105, 90 bent hose connector, all with 24/40 type), rubber cocks, parafilm and tubing, a plastic 3-port valve (T-shaped) with a plastic fitting cock, and glass wool (10-15 g). Other requirements for the experiments were a graduated cylinder (500 ml), pipette (5 ml), thermocouple, gas mass flow meter (0-5 L/min), CO$_2$ concentration analyzer (0-20%), and a timer. A thermometer is fitted through the small hole to measure the temperature of the solution.

Typical Experimental Run

The set-up was built as shown in FIG. 7. All the connections were properly sealed so as to avoid gas leakage. A small amount (3-4 g) of glass wool was then placed at the bottom end of the absorber to support the catalyst. The liquid condenser (12/20) in the right line was filled with cold water and sealed at both exits with parafilm. The MEA solution was pre-loaded with CO$_2$ to the desired CO$_2$ loading. The initial loading, temperature of the lean MEA solution, initial gas flow rate and the concentration of CO$_2$ in the inlet gas were recorded. These initial conditions for all experiments were made as close as possible to each other in order to be able to compare the results.

Firstly the mixed gas was introduced at the desired flow rate to flow through the absorber and coming out at the CO$_2$ analyzer outlet where the outlet (off gas) was measured. At this point the CO$_2$ concentration in the inlet gas was the same as the outlet CO$_2$ concentration. Then, MEA solution was pumped and introduced into the absorption column at the top position through a condenser at the desired temperature and flow rate. Then, the bottom of the 3-port valve (T shape) was closed with plastic cock to seal the whole process. Then the timer was started and data were recorded every 5 seconds including the temperature of amine in the storage bottle and the CO$_2$ gas concentration. The temperature of the amine increases and the CO$_2$ concentration decreases gradually because of CO$_2$ absorption. The process continued for about 5 minutes after which the pump was stopped and the mixed gas flow shut off. The volume of the amine collected in the storage bottle was determined with the graduated cylinder. Then, CO$_2$ loading of the rich MEA was also determined by titration using a Chittick apparatus. Finally, all the data are collected and the curve of CO$_2$ concentration vs. time can be drawn for the kinetic study.

Examples of Experiments Performed to Evaluate the Contribution of Acid Catalysts for CO$_2$ Stripping and Basic or Alkaline Catalysts for CO$_2$ Absorption in an Example of an Amine-Based Post Combustion CO$_2$ Capture Process Configuration Four sets of tests were performed on an example of a steady state CO$_2$ capture process involving CO$_2$ absorption and CO$_2$ desorption using different combinations of catalyst or no catalyst in the stripper and catalyst or no catalyst in the absorber in order to evaluate the individual contributions of the individual catalysts. These were: (a) solid alkaline catalyst in the absorber and solid acid catalyst in the stripper, (b) no catalyst in the absorber and no catalyst in the stripper, (c) no catalyst in the absorber but a solid acid catalyst in the stripper, and (d) a solid alkaline catalyst in absorber but no catalyst in the stripper. The performance of the catalysts in the four scenarios was evaluated in terms of CO$_2$ absorption kinetics heat duty and desorption temperature.

Experimental Setup

Figure 8:
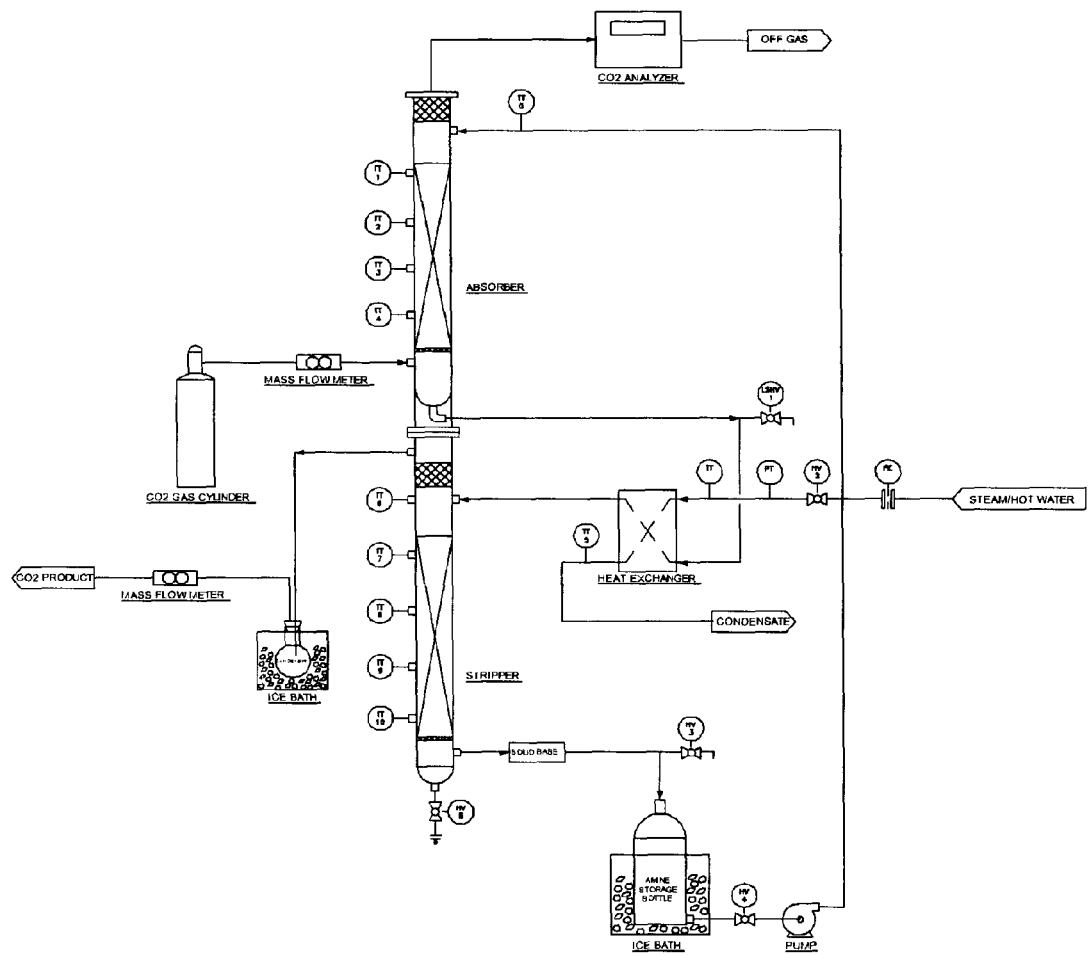
FIG. 8: Process configuration Used to Test Catalytic $CO_2$ Absorption and Desorption.

The process configuration of the experimental setup was as shown in the schematic illustrated in FIG. 8. It consisted of two columns each of about 1000 mm in height. The top column was the absorber column (1.9 mm OD and 1.61 mm ID) which was bolted on top of the stripper column (2.375 mm OD and 2.967 mm ID) using flanges without any direct flow through between the two columns at the flanged section. For the absorber column, there are ports for gas inlet, off gas outlet, lean amine inlet and rich amine outlet. On the other hand, the stripper has ports for the rich amine inlet, lean amine outlet and CO$_2$ product outlet. The CO$_2$ product outlet flow passes through an ice bath to trap condensable vapors so as to allow only CO$_2$ gas to pass through the mass flow meter which measured the CO$_2$ production rate. On the other hand, the rich amine from the absorber column passes through a stainless steel plate type heat exchanger with the heating fluid being steam or hot water (depending on the desired rich amine inlet temperature to the stripper column) before entering the stripper column. The lean amine from the stripper passes through a solid base or alkaline catalyst in order to neutralize the lean amine coming out of the stripper before being cooled in an ice bath to the desired temperature, and before being pumped to the absorber column. Both the absorber and stripper columns each had about 5 thermocouple ports placed at about 150 mm spacing along the length of the columns in order to measure the temperature profile along the columns.

A typical experimental run involved introducing the desired amount of the desired catalyst solid acid catalyst into the stripper and also the desired amount of the desired base or alkaline catalyst into the absorber. With the catalysts in place, and the setup assembled as shown in FIG. 8, the amine (e.g. MEA) solution of the desired molarity is pumped from the amine storage bottle and introduced in the absorber column through the top port and is circulated at the desired steady state flow rate. Then steam or hot water is introduced in the heat exchanger in co-current mode with the rich amine flow which is heated to about 96° C. Steady state was achieved after about 45-60 min after which the gas mixture of known $CO_2$ concentration (e.g. 13% $CO_2$ concentration, balance nitrogen) of the desired flow rate (e.g. 1.8 L/min) was introduced into the absorber column through the bottom port as shown in the figure. The whole process takes about 120 minutes during which time (i.e. after steady state had been reached) the rich amine loading, lean loading, temperature profiles of both stripper and absorber columns, $CO_2$ concentration in the off-gas, steam or hot water rate and temperature, and $CO_2$ product rate were measured. The results are shown in Tables 10-13 a-d for the four scenarios. It should be noted that any scenarios where the solid acid catalyst is contained in the stripper also includes possibilities where the solid acid catalyst is contained in units adjacent to the stripper such as tubes and/or lines and/or pipes and/or vessels that exit or enter the stripper column or are close to the stripper column for which there is any $CO_2$ desorption. Similarly, the scenarios where the solid alkaline catalyst is contained in the absorber also includes the possibilities where the catalyst is contained in units adjacent to the absorber such as tubes and/or lines and/or pipes and/or vessels that exit or enter the absorber column or are close to the absorber column for which there is contact of the $CO_2$ containing gas (e.g. flue gases, reformate gas, natural gas, etc.) with the liquid absorbent.

Results of the Experimental Evaluation of the Contribution of Acid Catalysts in $CO_2$ Stripping Effect of the Presence of Proton Donor Solid Acid Catalyst (HZSM-5)

Figure 9:
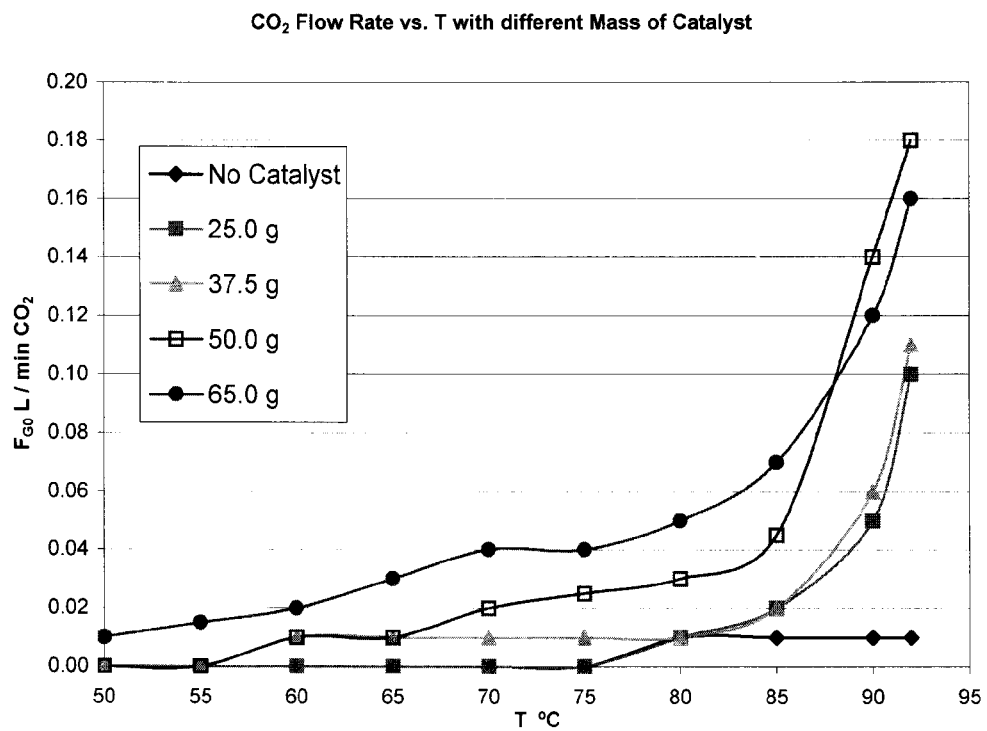
FIG. 9: Desorbed $CO_2$ Flow Rate as a Function of Desorption Temperature for Different Amounts of Solid Acid HZSM-5 Catalyst.

The results showing the contribution of proton donor solid acid catalyst (H-ZSM-5) are given in Table 5 as well as in FIG. 9. It is clear from both Table 5 and FIG. 9 that without the catalyst, there is no desorption of $CO_2$ from the loaded amine up to 75° C., and negligible $CO_2$ desorption from 75 to 95° C. This shows that, at these temperatures, using the thermal process alone, it is difficult to strip $CO_2$ from loaded amine because of the high activation energy involved in the process in addition to the deficiency in protons. In the presence of the proton donor solid acid catalyst, the results show that there is $CO_2$ desorption and the rate of $CO_2$ desorption increases with temperature even at temperatures below 92° C. (which is well below the conventional stripping temperature for a purely thermal process). $CO_2$ stripping at this low temperature can be attributed to the presence of protons introduced by the proton donor solid acid catalyst. The increase in the proton concentration in the system decreases the activation energy required for stripping, and therefore shifts the mechanism or pathway in favor of the one with a lower activation energy which facilitates $CO_2$ stripping for this highly endothermic process. In order to directly show that a higher concentration leads to a higher desorption rate, we conducted a number of $CO_2$ desorption experiments with different amounts of the proton donor solid acid catalyst. The results are also given in Table 5 and FIG. 9. It can be seen from these results that the higher the amount of proton donor solid acid catalyst, the higher the $CO_2$ desorption rate and the lower the temperature $CO_2$ desorption starts. These results confirm that a higher amount of protons in the desorption system causes a bigger decrease in the activation energy required for $CO_2$ stripping.

TABLE 5

Desorbed $CO_2$ Flow Rate (L/min) for 300 ml of Rich MEA Solution (5M, α = 0.45) for Different Amounts of H-ZSM-5 (g)

| T/° C. | $F_{CO2}$ | Mass of H-ZSM-5 (g) | | | |
|---|---|---|---|---|---|
| | 0 | 25.0 | 37.5 | 50.0 | 65 |
| 50 | 0.00 | 0.00 | 0.00 | 0.00 | 0.01 |
| 55 | 0.00 | 0.00 | 0.00 | 0.00 | 0.01$_5$ |
| 60 | 0.00 | 0.00 | 0.01 | 0.01 | 0.02 |
| 65 | 0.00 | 0.00 | 0.01 | 0.01 | 0.03 |
| 70 | 0.00 | 0.00 | 0.01 | 0.02 | 0.04 |
| 75 | 0.00 | 0.00 | 0.01 | 0.02 | 0.04 |
| 80 | 0.01 | 0.01 | 0.01 | 0.03 | 0.05 |
| 85 | 0.01 | 0.02 | 0.02 | 0.04 | 0.07 |
| 90 | 0.01 | 0.05 | 0.06 | 0.14 | 0.12 |
| 92 | 0.01 | 0.10 | 0.11 | 0.18 | 0.16 |

Effect of Amine Molarity

Figure 10:
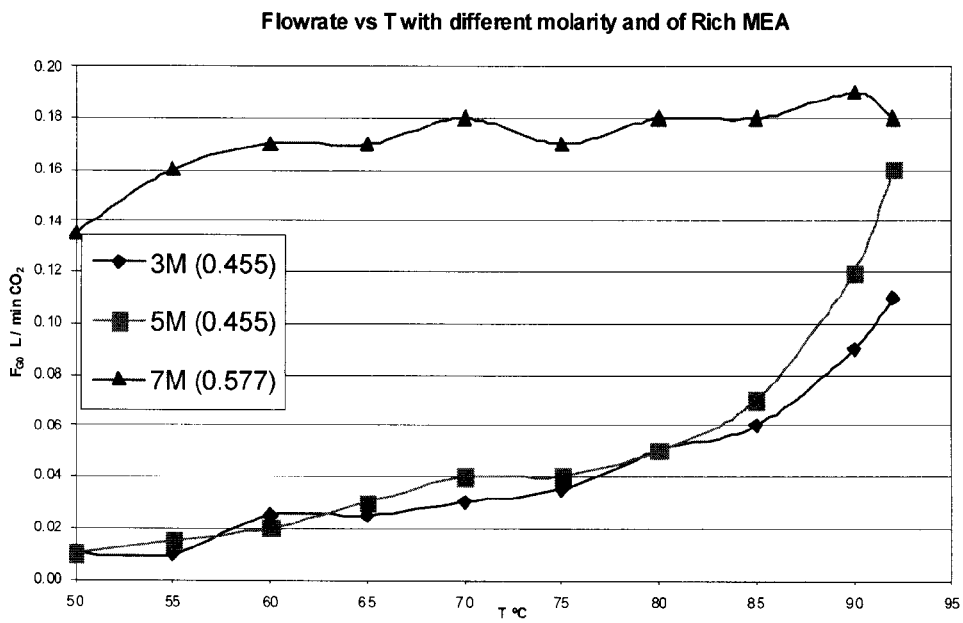
FIG. 10: Desorbed $CO_2$ Flow Rate (L/min) for 300 ml of Rich MEA Solution with 65.0 g H-ZSM-5 for Various Molarities and Loading.

The effect of the amine molarity on $CO_2$ desorption rate is illustrated in Table 6 as well as FIG. 10. The results show that starting from the same $CO_2$ rich loading (e.g. 0.455 mol $CO_2$/mol MEA), there is only a slight increase in $CO_2$ desorption rate with MEA molarity. Thus, the contribution of MEA molarity to $CO_2$ desorption rate is small provided there is sufficient amount of protons introduced in the system from the proton donor solid catalyst. It can also be observed from the results that a combination of high $CO_2$ loading (0.577 mol $CO_2$/mol MEA) and high molarity (7 mol/L MEA) results in a benefit in that a high rate of desorption of $CO_2$ is obtained and it starts at a very low temperature (<50° C.).

TABLE 6

Desorbed $CO_2$ Flow Rate (L/min) for 300 ml of Rich MEA Solution with 65.0 g H-ZSM-5 for Various Molarities and Loading

| T/° C. | $F_{CO2}$ | MEA solution with different Loading | |
|---|---|---|---|
| | 3M (0.455) | 5M (0.455) | 7M (0.577)[a] |
| 50 | 0.01 | 0.01 | 0.13$_5$ |
| 55 | 0.01 | 0.01$_5$ | 0.16 |
| 60 | 0.02$_5$ | 0.02 | 0.17 |
| 65 | 0.02$_5$ | 0.03 | 0.17 |
| 70 | 0.03 | 0.04 | 0.18 |
| 75 | 0.03$_5$ | 0.04 | 0.17 |
| 80 | 0.05 | 0.05 | 0.18 |
| 85 | 0.06 | 0.07 | 0.18 |
| 90 | 0.09 | 0.12 | 0.19 |
| 92 | 0.11 | 0.16 | 0.18 |

[a] 7M MEA solution is over loaded (>0.5).

Effect of $CO_2$ Loading in Rich Amine

Figure 11:
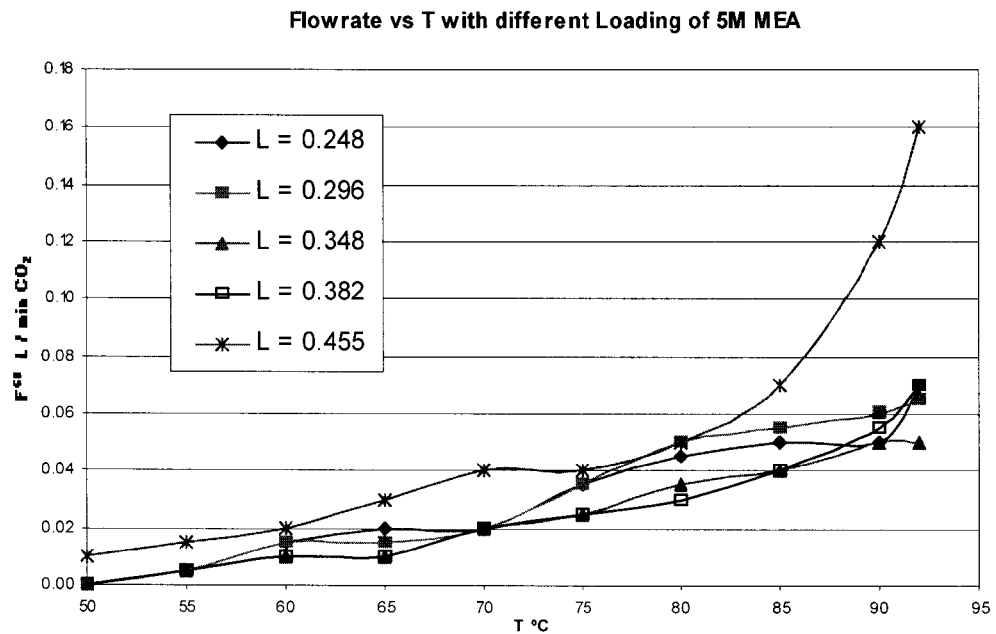
FIG. 11: Catalysis of $CO_2$ desorption of 5M MEA solution under 65.0 g HZSM-5 Catalyst with different MEA loadings.

The specific contribution of $CO_2$ loading to $CO_2$ stripping in the presence of the proton donor catalyst is shown in Table 7 as well as in FIG. 11. The results show clearly that there are positive benefits from a high $CO_2$ loading in the rich amine resulting in increased rate of $CO_2$ desorption.

TABLE 7

Desorbed $CO_2$ Flow Rate (L/min) for 300 ml of
Rich MEA Solution (5M) with 65.0 g HZSM-5 Catalyst
for Various Loadings and Temperatures

| T/° C. | Loading (α) | | | | |
|---|---|---|---|---|---|
| | 0.248 | 0.296 | 0.348 | 0.382 | 0.455 |
| 50 | 0.00 | 0.00 | 0.00 | 0.00 | 0.01 |
| 55 | 0.00$_5$ | 0.00$_5$ | 0.00$_5$ | 0.00$_5$ | 0.01$_5$ |
| 60 | 0.01$_5$ | 0.01$_5$ | 0.01 | 0.01 | 0.02 |
| 65 | 0.02 | 0.01$_5$ | 0.01 | 0.01 | 0.03 |
| 70 | 0.02 | 0.02 | 0.02 | 0.02 | 0.04 |
| 75 | 0.03$_5$ | 0.03$_5$ | 0.02$_5$ | 0.02$_5$ | 0.04 |
| 80 | 0.04$_5$ | 0.05 | 0.03$_5$ | 0.03 | 0.05 |
| 85 | 0.05 | 0.05$_5$ | 0.04 | 0.04$_0$ | 0.07 |
| 90 | 0.05 | 0.06 | 0.05 | 0.05$_5$ | 0.12 |
| 92 | 0.07 | 0.06$_5$ | 0.05 | 0.07 | 0.16 |

Effect of Type of Acid Catalyst

Figure 12:
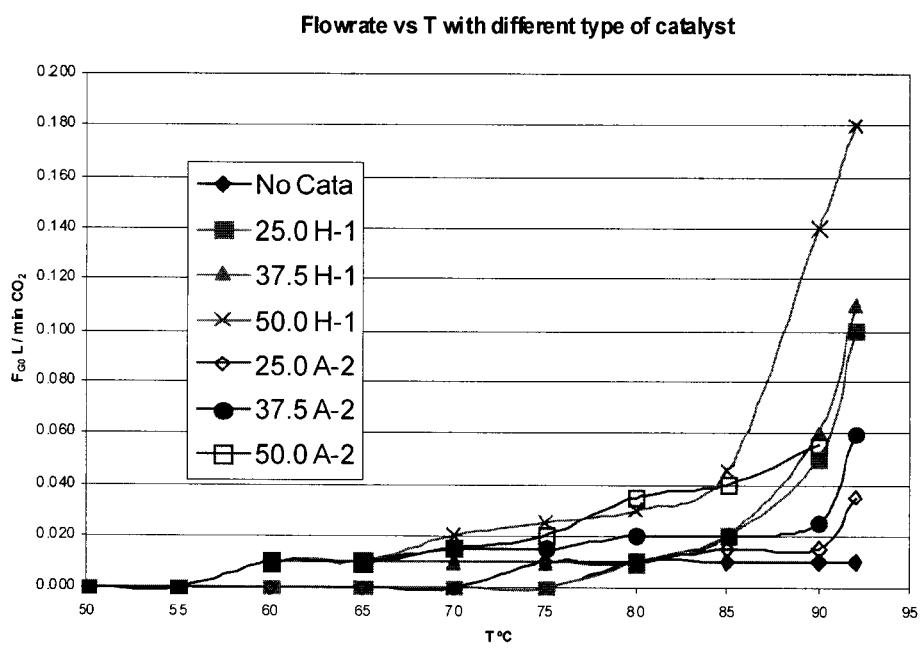
FIG. 12: Desorbed $CO_2$ Flow Rate (L/min) for 300 ml of Rich MEA Solution (5M, $\alpha$=0.45) for Different Types of Solid Acid Catalysts (HZSM-5=H-1 and $\gamma$-$Al_2O_3$=A-2)
Figure 13:
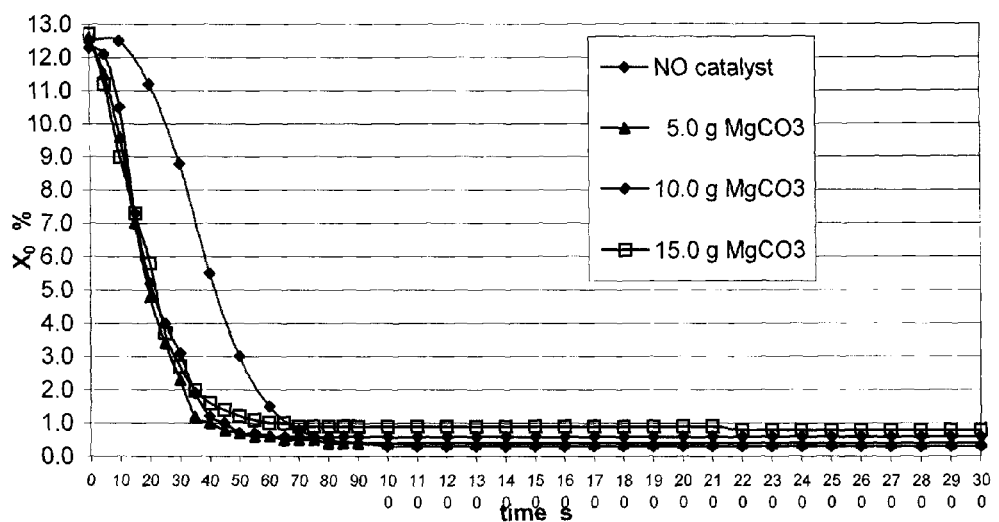
FIG. 13: $CO_2$ absorption rate for Various Amounts of $MgCO_3$ Catalyst.

In these experiments, we compared two types of solid acid catalysts: (a) a proton donor catalyst (e.g. HZSM-5) and an electron acceptor catalyst (e.g. γ-$Al_2O_3$) for their effects on $CO_2$ desorption from $CO_2$ loaded rich MEA solutions. The molarity of MEA was 5 mol/L and the $CO_2$ loading was 0.45 mol $CO_2$/mol MEA. The results are given in Table 8 as well as in FIG. 12. The results for $CO_2$ desorption without any catalyst are also shown for comparison. It can be seen that for the same amount of catalyst at any desorption temperature, the proton donor solid acid catalyst are better than the electron acceptor solid acid catalyst as there are higher $CO_2$ desorption rates when the proton donor solid catalysts are used as compared to the electron acceptor catalysts. Also, for each catalyst, the $CO_2$ desorption increases with the amount of catalyst used. There is negligible $CO_2$ desorption when no catalyst is used as mentioned earlier.

TABLE 8

Desorbed $CO_2$ Flow Rate (L/min) for 300 ml of Rich MEA Solution
(5M, α = 0.45) for Different Types of Solid Acid Catalysts
(Proton Donor Solid Acid Catalyst (HZSM-5) and Electron Acceptor
Solid Acid Catalyst (γ-$Al_2O_3$))

| T/ °C. | $F_{G0}$ No Cata | HZSM-5 | | | γ-$Al_2O_3$ | | |
|---|---|---|---|---|---|---|---|
| | | 25.0 g | 37.5 g | 50.0 g | 25.0 g | 37.5 g | 50.0 g |
| 50 | 0.00 | 0.00 | 0.00 | 0.00 | 0.00 | 0.00 | 0.00 |
| 55 | 0.00 | 0.00 | 0.00 | 0.00 | 0.00 | 0.00 | 0.00 |
| 60 | 0.00 | 0.00 | 0.01 | 0.01 | 0.00 | 0.01 | 0.01 |
| 65 | 0.00 | 0.00 | 0.01 | 0.01 | 0.00 | 0.01 | 0.01 |
| 70 | 0.00 | 0.00 | 0.01 | 0.02 | 0.00 | 0.01$_5$ | 0.01$_5$ |
| 75 | 0.00 | 0.00 | 0.01 | 0.02$_5$ | 0.01 | 0.01$_5$ | 0.02 |
| 80 | 0.01 | 0.01 | 0.01 | 0.03 | 0.01 | 0.02 | 0.03$_5$ |
| 85 | 0.01 | 0.02 | 0.02 | 0.04$_5$ | 0.01$_5$ | 0.02 | 0.04 |
| 90 | 0.01 | 0.05 | 0.06 | 0.14 | 0.01$_5$ | 0.02$_5$ | 0.05$_5$ |
| 92 | 0.01 | 0.10 | 0.11 | 0.18 | 0.03$_5$ | 0.06 | |

Results of the Experimental Evaluation of the Contribution of Basic or Alkaline Catalysts in $CO_2$ Absorption The effect of a solid alkaline catalyst in the absorber on $CO_2$ absorption is illustrated in Table 9 as well as FIG. 14. The results show the concentration of the gas mixture coming out of the absorber containing either a solid alkaline catalyst of different amounts or with no catalyst. There is a clear distinction between the runs with catalysts and the one without catalyst. As can be seen, the $CO_2$ concentration in the off-gas decreases more rapidly with catalyst than without catalyst indicating more rapid absorption of $CO_2$ with catalyst than without catalyst. Within the limits of amounts used for the experiment, the amount of catalyst does not seem to produce any significant change in the $CO_2$ absorption rate.

TABLE 9

Concentration of $CO_2$ in the Outlet
gas for Different amounts of $MgCO_3$

| Time | Amount of Catalyst | | | |
|---|---|---|---|---|
| | No Catalyst | 5.0 g | 10.0 g | 15.0 g |
| 0 | 12.5 | 12.6 | 12.3 | 12.7 |
| 5 | | 11.5 | 12.1 | 11.2 |
| 10 | 12.5 | 9.6 | 10.5 | 9.0 |
| 15 | | 7.0 | 7.3 | 7.3 |
| 20 | 11.2 | 4.8 | 5.2 | 5.8 |
| 25 | | 3.4 | 4.0 | 3.7 |
| 30 | 8.8 | 2.3 | 3.1 | 2.7 |
| 35 | | 1.2 | 1.9 | 2.0 |
| 40 | 5.5 | 1.0 | 1.2 | 1.6 |
| 45 | | 0.8 | 1.0 | 1.4 |
| 50 | 3.0 | 0.7 | 0.7 | 1.2 |
| 55 | | 0.6 | 0.7 | 1.1 |
| 60 | 1.5 | 0.6 | 0.6 | 1.0 |
| 65 | | 0.5 | 0.6 | 1.0 |
| 70 | 0.8 | 0.5 | 0.6 | 0.9 |
| 75 | | 0.5 | 0.6 | 0.9 |
| 80 | 0.5 | 0.4 | 0.6 | 0.9 |
| 85 | | 0.4 | 0.6 | 0.9 |
| 90 | 0.4 | 0.4 | 0.6 | 0.9 |
| 100 | 0.3 | 0.4 | 0.6 | 0.9 |
| 110 | 0.3 | 0.4 | 0.6 | 0.9 |
| 120 | 0.3 | 0.4 | 0.6 | 0.9 |
| 130 | 0.3 | 0.4 | 0.6 | 0.9 |
| 140 | 0.3 | 0.4 | 0.6 | 0.9 |
| 150 | 0.3 | 0.4 | 0.6 | 0.9 |
| 160 | 0.3 | 0.4 | 0.6 | 0.9 |
| 170 | 0.3 | 0.4 | 0.6 | 0.9 |
| 180 | 0.3 | 0.4 | 0.6 | 0.9 |
| 190 | 0.3 | 0.4 | 0.6 | 0.9 |
| 200 | 0.3 | 0.4 | 0.6 | 0.9 |
| 210 | 0.3 | 0.4 | 0.6 | 0.9 |
| 220 | 0.3 | 0.4 | 0.6 | 0.8 |
| 230 | 0.3 | 0.4 | 0.6 | 0.8 |
| 240 | 0.3 | 0.4 | 0.6 | 0.8 |
| 250 | 0.3 | 0.4 | 0.6 | 0.8 |
| 260 | 0.3 | 0.4 | 0.6 | 0.8 |
| 270 | 0.3 | 0.4 | 0.6 | 0.8 |
| 280 | 0.3 | 0.4 | 0.6 | 0.8 |
| 290 | 0.3 | 0.4 | 0.6 | 0.8 |
| 300 | 0.3 | 0.4 | 0.6 | 0.8 |
| $F_{G0}$, $F_{L0}$ (L/min) | 1.81; 0.13 | 1.91; 0.12 | 1.76; 0.11 | 1.75; 0.12 |
| V of MEA (ml) | 400 | 365 | 360 | 370 |
| Initial α | 0.171 | 0.151 | 0.167 | 0.177 |
| Final α | 0.237 | 0.196 | 0.236 | 0.232 |

Inlet gas is premixed $CO_2$ (13%) with $N_2$; Inlet Liquid is lean MEA solution Experimental Evaluation of the Contribution of an Acid Catalyst for $CO_2$ Stripping and Basic or Alkaline Catalysts in $CO_2$ Absorption in an Example of an Amine-Based Post Combustion $CO_2$ Capture Process Configuration Results were collected from four sets of tests performed on a steady state $CO_2$ capture process involving $CO_2$ absorption and $CO_2$ desorption using different combinations of catalyst or no catalyst in the stripper and catalyst or no catalyst in the absorber in order to evaluate the individual contributions of the individual catalysts. These were: (a) solid alkaline catalyst in the absorber and solid acid catalyst in the stripper, (b) no catalyst in the absorber and no catalyst in the stripper, (c) no catalyst in the absorber but a solid acid catalyst in the stripper, and (d) a solid alkaline catalyst in absorber but no catalyst in the stripper. The performance of the catalysts in the four scenarios was evaluated in terms of $CO_2$ absorption kinetics heat duty and desorption temperature. These are shown in Tables 10, 11, 12 and 13, respectively. The rate of $CO_2$ desorption is shown as $F_{CO2}$ (L/min)

as measured by the flow meter while the rate of absorption is given as $F_{CO2abs}$. The results in Table 10 show a rapid absorption of $CO_2$ and a substantial desorption of $CO_2$ when the alkaline solid catalyst and the solid acid catalysts are used simultaneously in the absorber and stripper, respectively in a continuous steady state process. The heat duty obtained under this condition was 1.56 GJ/tonne of $CO_2$ produced. The heat supply was calculated based on the heat balance around the stripper shown in FIG. 8 whereas the $CO_2$ produced was as measured by the flowmeter and was comparable with the value obtained by lean amine-rich amine difference. The heat duty obtained in this process represents an improvement when compared with the fact that the best reported heat duty using the same absorbent (5 molar MEA) without the catalyst is 2.58 GJ/tonne $CO_2$ produced (PCT/CA2008/001029). In the case where there is no catalyst in the absorber and no catalyst in the stripper, Table 11 shows that there is absorption in the absorption column but the $CO_2$ desorption rate is negligible. The reason is that the activation energy for stripping is too high and the temperature of operation is not able to supply this large external heat. There is absorption without catalyst but the rate is not as rapid as with the alkaline catalysts.

With the solid acid catalyst only in the stripper column, Table 12 shows that there is substantial desorption of $CO_2$ similar to first case of Table 10 (where there was catalyst in both columns). Table 12 shows that the rich loading for the case of the solid catalyst only in the stripper (0.389 mol $CO_2$/mol MEA) was lower than the rich loading for the case (Table 10) where there was catalyst in both columns (0.422 mol $CO_2$/mol MEA) for corresponding experimental times. This demonstrates that the presence of the solid alkaline catalyst facilitated absorption leading to much higher $CO_2$ absorption rates. In the case where there is a solid alkaline catalyst in the absorber (Table 13), the results for $CO_2$ desorption are equivalent to the case given in Table 11 which also did not contain a catalyst in the stripper column. Therefore a solid acid catalyst is crucial in reducing the activation energy for $CO_2$ desorption because it provides the protons necessary to shift the equilibrium towards a lower temperature $CO_2$ desorption thereby minimizing the external energy supply. On the other hand, a solid alkaline catalyst is required in the absorber to increase the rate of absorption resulting in a higher $CO_2$ rich loading. This high absorption rate reduces the size of the absorption column.

TABLE 10

Steady State Flow process of $CO_2$ absorption and desorption with catalysts in both column.[a]

| Fl L/min | Fg[b] L/min | Fl/Fg L/mol | time min | X % % | $F_{CO2}$ L/min | $F_{CO2}$ des[c] L/min | $F_{CO2}$ abs L/min | Rich loading | Lean loading | T0 | T1 | T2 |
|---|---|---|---|---|---|---|---|---|---|---|---|---|
| | | | | | | | | | | | Degree | |
| 0.10 | 1.8 | 1.25 | 120 | 1.5 | 0.14-0.24 | 0.190 | 0.216 | 0.384 | 0.371 | 45.7 | 54.0 | 53.9 |
| | | | 150 | 1.6 | 0.15-0.24 | 0.195 | 0.214 | 0.404 | 0.385 | 42.5 | 49.0 | 48.5 |
| | | | 180 | 1.4 | 0.15-0.25 | 0.200 | 0.218 | 0.419 | 0.390 | 44.8 | 50.7 | 51.1 |
| | | | 200 | 1.4 | 0.15-0.25 | 0.200 | 0.218 | 0.422 | 0.399 | 44.9 | 50.6 | 50.9 |

| Fl L/min | Fg[b] L/min | Fl/Fg L/mol | time min | T3 | T4 | T6 | T7 | T8 | T9 | T10 | $T_{steam}$ | $T5_{HE}$ |
|---|---|---|---|---|---|---|---|---|---|---|---|---|
| | | | | | | | | Degree | | | | |
| 0.10 | 1.8 | 1.25 | 120 | 54.8 | 54.3 | 95.1 | 94.0 | 93.3 | 93.1 | 92.9 | 100.7 | 97.4 |
| | | | 150 | 49.1 | 48.7 | 94.8 | 93.6 | 93.2 | 92.9 | 92.5 | 100.7 | 97.3 |
| | | | 180 | 52.5 | 51.7 | 95.0 | 93.8 | 93.3 | 92.9 | 91.8 | 100.7 | 97.3 |
| | | | 200 | 52.0 | 51.2 | 95.0 | 93.8 | 93.3 | 92.8 | 92.5 | 100.7 | 97.3 |

[a]50.0 g of $CaCO_3$ mixed with glass marbles introduced in the absorber and 120.0 g H-ZSM-5 mixed with 790 g $\alpha$-$Al_2O_3$ introduced in the stripper.
[b]The $CO_2$ concentration of mixed gas is 13.5%, balance $N_2$.
[c]Average value read from gas flow meter
Heat Duty = 1.56 GJ/tonne of $CO_2$ produced

TABLE 11

Steady State Flow process for $CO_2$ absorption and desorption with no catalysts in either column.[a]

| Fl L/min | Fg[b] L/min | Fl/Fg L/mol | time min | X % % | $F_{CO2}$ L/min | $F_{CO2}$ des L/min | $F_{CO2}$ abs L/min | Rich loading | Lean loading | T0 | T1 | T2 |
|---|---|---|---|---|---|---|---|---|---|---|---|---|
| | | | | | | | | | | | Degree | |
| 0.10 | 1.0 | 2.25 | 0 | N/A | −0.05~0.02 | 0.000 | 0.000 | N/A | N/A | 30.1 | 38.0 | 36.9 |
| | | | 30 | 0.2 | −0.08~0.04 | 0.000 | 0.140 | N/A | N/A | 46.2 | 58.7 | 58.2 |
| | | | 60 | 0.3 | −0.08~0.05 | 0.000 | 0.139 | N/A | N/A | 46.6 | 57.4 | 56.7 |
| 0.10 | 1.8 | 1.25 | 90 | 0.4 | −0.09~0.04 | 0.000 | 0.248 | N/A | N/A | 46.5 | 55.7 | 55.5 |
| | | | 120 | 0.4 | −0.08~0.04 | 0.000 | 0.248 | 0.313 | 0.330 | 46.6 | 55.9 | 55.6 |
| | | | 150 | 0.7 | −0.08~0.05 | 0.000 | 0.243 | 0.348 | 0.357 | 46.1 | 54.6 | 54.6 |
| | | | 180 | 0.9 | −0.05~0.06 | 0.045 | 0.239 | 0.402 | 0.398 | 44.7 | 53.5 | 53.6 |
| | | | 200 | 1.4 | −0.05~0.08 | 0.088 | 0.230 | 0.419 | 0.412 | 45.7 | 56.1 | 55.3 |

| Fl L/min | Fg[b] L/min | Fl/Fg L/mol | time min | T3 | T4 | T6 | T7 | T8 | T9 | T10 | $T_{steam}$ | $T5_{HE}$ |
|---|---|---|---|---|---|---|---|---|---|---|---|---|
| | | | | | | | | Degree | | | | |
| 0.10 | 1.0 | 2.25 | 0 | 34.6 | 34.0 | 92.5 | 82.0 | 76.5 | 74.5 | 67.4 | 100.2 | 97.0 |
| | | | 30 | 56.5 | 55.6 | 94.8 | 79.3 | 86.3 | 85.8 | 85.7 | 101.1 | 97.9 |
| | | | 60 | 54.8 | 54.2 | 94.8 | 87.3 | 87.6 | 86.5 | 85.2 | 101.2 | 97.9 |

TABLE 11-continued

Steady State Flow process for $CO_2$ absorption and desorption with no catalysts in either column.[a]

| | | | | | | | | | | | | |
|---|---|---|---|---|---|---|---|---|---|---|---|---|
| 0.10 | 1.8 | 1.25 | 90 | 54.6 | 55.3 | 94.8 | 79.9 | 85.5 | 86.2 | 84.8 | 101.3 | 97.9 |
| | | | 120 | 53.6 | 54.2 | 95.9 | 81.0 | 86.4 | 86.2 | 85.2 | 101.2 | 97.9 |
| | | | 150 | 53.3 | 54.2 | 95.9 | 90.1 | 89.8 | 87.6 | 85.4 | 101.2 | 97.8 |
| | | | 180 | 52.5 | 53.1 | 94.8 | 92.1 | 92.0 | 90.7 | 89.4 | 100.6 | 97.3 |
| | | | 200 | 53.6 | 52.5 | 94.8 | 93.5 | 93.0 | 91.9 | 90.5 | 100.8 | 97.5 |

[a]Absorber is packed with inert glass marbles and stripper is packed with inert beads
[b]The $CO_2$ concentration of mixed gas is 14.2%, balance $N_2$.

TABLE 12

Steady State Flow process for $CO_2$ absorption and desorption with catalysts in stripper only.[a]

| Fl L/min | Fg[b] L/min | Fl/Fg L/mol | time min | X % % | $F_{CO2}$ L/min | $F_{CO2}$ des[c] L/min | $F_{CO2}$ abs L/min | Rich loading | Lean loading | T0 | T1 Degree | T2 |
|---|---|---|---|---|---|---|---|---|---|---|---|---|
| 0.10 | 1.8 | 1.25 | 120 | 2.2 | 0.08–0.19 | 0.135 | 0.216 | 0.362 | 0.357 | 48.6 | 62.9 | 61.4 |
| | | | 150 | 2.5 | 0.12–0.20 | 0.175 | 0.211 | 0.378 | 0.362 | 53.9 | 63.5 | 63.2 |
| | | | 180 | 2.4 | 0.14–0.22 | 0.180 | 0.212 | 0.384 | 0.357 | 52.4 | 61.9 | 61.5 |
| | | | 200 | 2.4 | 0.14–0.23 | 0.185 | 0.212 | 0.389 | 0.362 | 51.7 | 61.1 | 60.8 |

| Fl L/min | Fg[b] L/min | Fl/Fg L/mol | time min | T3 | T4 | T6 | T7 | T8 Degree | T9 | T10 | $T_{steam}$ | $T5_{HE}$ |
|---|---|---|---|---|---|---|---|---|---|---|---|---|
| 0.10 | 1.8 | 1.25 | 120 | 58.7 | 58.0 | 95.4 | 94.4 | 94.3 | 93.7 | 93.5 | 100.7 | 97.4 |
| | | | 150 | 61.9 | 62.3 | 95.2 | 94.1 | 94.1 | 93.9 | 93.5 | 100.6 | 97.3 |
| | | | 180 | 60.7 | 61.3 | 95.1 | 94.1 | 94.1 | 93.8 | 93.4 | 100.6 | 97.3 |
| | | | 200 | 59.2 | 60.4 | 95.2 | 94.1 | 94.0 | 93.8 | 93.3 | 100.6 | 97.3 |

[a]Absorber packed with glass marbles and Stripper packed with 120.0 g H-ZSM-5 mixed with 790 g α-$Al_2O_3$.
[b]The $CO_2$ concentration of mixed gas is 14.2%, balance $N_2$.
[c]Averaged value read from gas flow meter

TABLE 13

Steady State Flow process for $CO_2$ absorption and desorption with catalysts in absorber only.[a]

| Fl L/min | Fg[b] L/min | Fl/Fg L/mol | time min | X % % | $F_{CO2}$ L/min | $F_{CO2}$ des[c] L/min | $F_{CO2}$ abs L/min | Rich loading | Lean loading | T0 | T1 Degree | T2 |
|---|---|---|---|---|---|---|---|---|---|---|---|---|
| 0.10[d] | 1.0 | 2.25 | 0 | N/A | N/A | N/A | N/A | N/A | N/A | 24.3 | 23.8 | 23.8 |
| | | | 30 | 1.6 | 0.00~0.03 | 0.000 | 0.126 | N/A | N/A | 26.1 | 29.1 | 29.7 |
| | | | 60 | 1.7 | 0.000 | 0.000 | 0.123 | N/A | N/A | 43.4 | 52.2 | 53.0 |
| 0.10 | 1.8 | 1.25 | 90 | 1.8 | −0.02~0.03 | 0.000 | 0.223 | N/A | N/A | 43.1 | 52.7 | 53.3 |
| | | | 120 | 2.0 | −0.03~0.05 | 0.000 | 0.220 | 0.383 | 0.392 | 43.6 | 51.1 | 51.5 |
| | | | 150 | 2.2 | −0.03~0.05 | 0.000 | 0.216 | 0.391 | 0.411 | 44.3 | 51.2 | 51.4 |
| | | | 180 | 2.3 | −0.03~0.05 | 0.000 | 0.214 | 0.400 | 0.411 | 45.3 | 52.9 | 52.8 |
| | | | 200 | 2.5 | −0.04~0.09 | 0.050 | 0.211 | 0.419 | 0.415 | 45.9 | 53.6 | 54.1 |
| 0.10[e] | 1.8 | 1.25 | 30 | 2.0 | −0.04~0.08 | 0.000 | 0.220 | 0.417 | 0.417 | 40.8 | 51.3 | 51.5 |
| | | | 60 | 2.2 | −0.06~0.08 | 0.050 | 0.216 | 0.427 | 0.422 | 46.7 | 56.9 | 57.3 |
| | | | 90 | 2.4 | −0.06~0.08 | 0.093 | 0.212 | 0.431 | 0.423 | 48.8 | 57.1 | 57.5 |
| | | | 120 | 2.5 | −0.08~0.11 | 0.100 | 0.211 | 0.431 | 0.422 | 49.5 | 57.1 | 57.7 |

| Fl L/min | Fg[b] L/min | Fl/Fg L/mol | time min | T3 | T4 | T6 | T7 | T8 Degree | T9 | T10 | $T_{steam}$ | $T5_{HE}$ |
|---|---|---|---|---|---|---|---|---|---|---|---|---|
| 0.10[d] | 1.0 | 2.25 | 0 | 23.6 | 23.4 | 21.2 | 19.5 | 19.5 | 19.5 | 19.5 | 22.8 | 23.6 |
| | | | 30 | 26.7 | 26.0 | 95.0 | 91.4 | 90.4 | 88.4 | 71.3 | 100.4 | 97.2 |
| | | | 60 | 51.7 | 50.8 | 95.0 | 92.1 | 91.2 | 90.3 | 89.7 | 100.4 | 97.1 |
| 0.10 | 1.8 | 1.25 | 90 | 52.4 | 52.2 | 94.9 | 92.4 | 92.1 | 91.3 | 90.8 | 100.4 | 97.1 |
| | | | 120 | 51.5 | 51.7 | 94.6 | 92.0 | 91.8 | 90.8 | 90.3 | 100.3 | 97.0 |
| | | | 150 | 51.0 | 50.8 | 94.3 | 91.9 | 91.6 | 90.3 | 90.0 | 100.4 | 97.0 |
| | | | 180 | 52.4 | 52.3 | 94.6 | 92.5 | 92.5 | 91.5 | 91.2 | 100.4 | 97.0 |
| | | | 200 | 53.7 | 53.7 | 94.6 | 92.5 | 92.2 | 91.5 | 91.1 | 100.3 | 97.0 |

TABLE 13-continued

Steady State Flow process for $CO_2$ absorption and desorption with catalysts in absorber only.[a]

| | | | | | | | | | | | | |
|---|---|---|---|---|---|---|---|---|---|---|---|---|
| 0.10[e] | 1.8 | 1.25 | 30 | 51.6 | 46.7 | 94.8 | 92.5 | 92.1 | 91.5 | 91.2 | 100.5 | 97.3 |
| | | | 60 | 56.8 | 57.1 | 95.0 | 93.0 | 92.7 | 92.4 | 91.8 | 100.5 | 97.2 |
| | | | 90 | 57.0 | 57.3 | 94.9 | 93.2 | 93.1 | 92.7 | 92.3 | 100.6 | 97.2 |
| | | | 120 | 57.3 | 57.6 | 95.2 | 93.3 | 93.2 | 92.8 | 92.4 | 100.6 | 97.3 |

[a]50.0 g of $CaCO_3$ mixed with glass marbles are packed in absorber and stripper is packed with inert beads
[b]The $CO_2$ concentration of mixed gas is 14.2%, balance $N_2$.
[c]The loading ($\alpha$) at 120 and 180 min showed the lean amine is richer than "rich" amine, which means no desorption occurs itn stripper at all. Therefore, the desorption rate of first 90 minutes can be regarded as zero.
[d]Steam rate of 1.20-1.35 kg/h
[e]Steam rate of 3.0-3.20 kg/h In the present disclosure we used computational and experimental estimates to construct an energy diagram that describes the $CO_2$ desorption or carbamate breakdown process accurately. The analysis of the energy diagram shows that the large heat requirement for $CO_2$ desorption (i.e. carbamate breakdown) may be due to insufficient protons in the system and/or the lack of stabilization of the zwitterions.

The present disclosure provides for a system comprising a chemical contribution for $CO_2$ absorption and $CO_2$ desorption. The chemical contribution may take the form of a solid acid catalyst which provides protons in the stripping process (e.g. in the stripper column) thereby stabilizing the zwitterions. This stabilization may reduce the energy required for $CO_2$ desorption. The chemical contribution may allow for the temperature of the heat supply medium for $CO_2$ desorption to start at as low as 50° C. and go up to 160° C., if desired.

The chemical contribution may comprise a solid alkaline catalyst which provides electrons in the absorber thereby increasing the rate of $CO_2$ absorption. This may allow for a reduced absorber column. Or extend the useful life of current equipment. Or allow for better removal of $CO_2$ from gas streams.

When using a solid acid catalyst in the stripper and a solid alkaline catalyst in the absorber the heat duty may be approximately 1.56 GJ/tonne $CO_2$ produced. This represents a tremendous improvement when compared with the best heat duty (2.58 GJ/tonne $CO_2$ produced) using the same absorbent (5 molar MEA) but without catalyst in both the stripper and absorber.

It is believed that the higher the amount of proton donor solid acid catalyst in the stripper column, the higher the $CO_2$ desorption rate and the lower the temperature $CO_2$ desorption starts. These results confirm that a higher amount of protons in the desorption system causes a bigger decrease in the activation energy required for $CO_2$ stripping.

Our results show that a combination of high $CO_2$ loading (e.g. 0.577 mol $CO_2$/mol MEA) and high molarity (e.g. 7 mol/L MEA) results in a benefit in that a high rate of desorption of $CO_2$ is obtained and it starts at a lower temperature (<50° C.).

There appears to be a superior performance of the proton donor catalyst over the electron acceptor catalysts which may be explained on the basis that $CO_2$ desorption from loaded $CO_2$ requires addition of protons rather than withdrawal of electrons. The proton donation step in the desorption mechanism alters the mechanism or pathway in favor of lowering the activation energy for $CO_2$ desorption. This may explain the beneficial effect of the proton donor catalyst over that of the electron acceptor catalyst even though both are acid catalysts.

The alkaline catalyst in the stripper can increase the rate of $CO_2$ absorption in the lean amine.

The present disclosure can be applied to other amine based or ammonia based methods for $CO_2$ absorption and desorption. This includes using different types of amines and/or absorbents, different process configurations, and using steam and/or hot water to provide the energy that is required for stripping for $CO_2$ capture from flue gas streams, natural gas, reformate gas, etc. In addition, with proper selection of the catalyst type, the device can also be used for catalytic distillation.

The acid catalyst may be contain in the stripper and/or may also be contained in units adjacent to the stripper such as tubes and/or lines and/or pipes and/or vessels that exit or enter the stripper column or are close to the stripper column for which there is any $CO_2$ desorption.

The alkaline catalyst may be contained in the absorber and/or may also be contained in units adjacent to the absorber such as tubes and/or lines and/or pipes and/or vessels that exit or enter the absorber column or are close to the absorber column for which there is contact of the $CO_2$ containing gas (e.g. flue gases, reformate gas, natural gas, etc.) with the absorbent.

The device can be applied to catalytic distillation, rectification, and any process that separates a component or components from multi-component streams.

REFERENCES

Brown and Foote, 2002. Organic Chemistry $3^{rd}$ ed., Harcourt College Publishers, Orlando, Fla.

Idem, R., Wilson, M., Toniwachwuthikul, P., Chakma, A., Veawab, A., Aroonwilas, A., Gelowitz, D., 2006. Pilot Plant Studies of the $CO_2$ Capture Performance of Aqueous MEA and Mixed MEA/MDEA Solvents at the University of Regina $CO_2$ Capture Technology Development Plant and the Boundary Dam $CO_2$ capture Demonstration Plant. Ind. Eng. Chem. Res. 45, 2414

Yagi, Y., Mimura, T., Iijima, M., Ishida, K., Yoshiyama, R., Kamijio, T., Yonekawa, T., 2005. Improvements of Carbon Dioxide Capture Technology from Flue Gas. 7th International Conference on Greenhouse Gas Control technologies, 5-9 Sep. 2004, Vancouver, Canada.

In the description that follows, a number of terms are used, the following definitions are provided to facilitate understanding of various aspects of the disclosure. Use of examples in the specification, including examples of terms, is for illustrative purposes only and is not intended to limit the scope and meaning of the embodiments of the invention herein. Numeric ranges are inclusive of the numbers defining the range. In the specification, the word "comprising" is used as an open-ended term, substantially equivalent to the phrase "including, but not limited to," and the word "comprises" has a corresponding meaning.

It is contemplated that any embodiment discussed in this specification can be implemented or combined with respect to any other embodiment, method, composition or aspect of the invention, and vice versa.

All citations are herein incorporated by reference, as if each individual publication was specifically and individually indicated to be incorporated by reference herein and as though it were fully set forth herein. Citation of references herein is not to be construed nor considered as an admission that such references are prior art to the present invention.

The invention includes all embodiments, modifications and variations substantially as hereinbefore described and with reference to the examples and figures. It will be apparent to persons skilled in the art that a number of variations and modifications can be made without departing from the scope of the invention as defined in the claims. Examples of such modifications include the substitution of known equivalents for any aspect of the invention in order to achieve the same result in substantially the same way.

The invention claimed is:

1. A process for separating at least a portion of an acid gas from a gaseous mixture, said process comprising:
   a. contacting the gaseous mixture with an absorption medium wherein said medium absorbs at least a portion of the acid gas to form a rich medium; and
   b. separating at least a portion of the acid gas from the rich medium to form a lean medium;
   wherein the absorption step is performed in the presence of a heterogeneous alkaline catalyst and the separation step is performed in the presence of a heterogeneous proton donor acid catalyst, wherein the heterogeneous alkaline catalyst is not present in step b, and the heterogeneous proton acid donor catalyst is not present in step a,
   wherein:
   the acid gas is carbon dioxide; the absorption medium is an amine;
   the heterogeneous proton donor acid catalyst is selected from heteropoly acids (HPAs), silica-supported Nafion (SAC-13), alumina, amorphous silica-alumina, molecular sieves, mesoporous aluminosilicates, clays, pillared clays (PILC), and acidic porous clay heterostructures (PCH), and combinations thereof; and the heterogeneous alkaline catalyst is selected from Na/NaOFi/AkCk, quaternary ammonium functionality supported over a resin (A26), quaternary ammonium salt functionalized silica gel, ZnO, ZrCh, TllO2, TiCk, CaO, MgO, MgCCk, SrO, BaO, Na metal dispersed on Al2O3, Na/MgO, La2O3, Y2O3, alkali metal oxides, alkali metal ions on alumina, alkali metal ions on silica, alkali metal on alkaline earth oxide, alkali metals and alkali metal hydroxides on alumina, basic clay minerals, KF supported on alumina and lanthanide imide and nitride on zeolite, and combinations thereof.

2. The process according to claim 1, wherein the amine is selected from monoethanolamine (MEA), diglycolamine (DGA), diethanolamine (DEA), methyldiethanolamine (MDEA), 2-amino-2-methyl-1-propanol (AMP), and piperazine (PZ).

3. The process according to claim 1, wherein the HPAs are selected from $H_3PW_{12}O_{40}$ and $H_3PMo_{12}O_{40}$.

4. The process according to claim 1, wherein the molecular sieves are selected from microporous aluminosilicates and zeolites.

5. The process according to claim 4, wherein the zeolites are selected from HZSM-5, H—Y and H—X.

6. The process according to claim 1, wherein the mesoporous aluminosilicates are selected from M41S aluminosilicates.

7. The process according to claim 6, wherein the M41S aluminosilicates are selected from MCM-41, SBA-15 and MCF.

8. The process according to claim 1, wherein the clays are selected from $AlCl_3/Al_2O_3$, $ZnCl_2$/Acid treated clays, $FeCl_3$/graphite, $SbF_5$/graphite, $AlCl_3$/graphite, vanadium phosphates, aluminophosphates, $CaO$—$ZrO_2$, $Sm_2O_3$—$ZrO_2$, $Yb_2O_3$—$ZrO_2$, aluminum chlorofluoride (ACF) and aluminum bromofluoride (ABF).

9. The process according to claim 8, wherein the ACF is $AlCl_xF_{3-x}$, wherein $x \approx 0.05$-$0.25$ and the ABF is $AlBr_xF_{3-x}$, wherein $x \approx 0.05$-$0.25$.

10. The process according to claim 1 wherein the heterogeneous proton donor acid catalyst is HZSM-5.

11. The process according to claim 1, wherein the heterogeneous alkaline catalyst is $MgCO_3$.

* * * * *

UNITED STATES PATENT AND TRADEMARK OFFICE
CERTIFICATE OF CORRECTION

PATENT NO. : 9,586,175 B2  
APPLICATION NO. : 13/638922  
DATED : March 7, 2017  
INVENTOR(S) : Raphael Idem et al.

Page 1 of 1

It is certified that error appears in the above-identified patent and that said Letters Patent is hereby corrected as shown below:

In the Claims

1. Column 26, Lines 4-6, "ZrCH, T11O2, TiCk, CaO, MgO, MgCCK, SrO, BaO, Na metal dispersed on Al2O3, Na/MgO, La2O3, Y2O3" should read --"$ZrO_2$, $ThO_2$, $TiO_2$, CaO, MgO, $MgCO_3$, SrO, BaO, Na metal dispersed on $Al_2O_3$, Na/MgO, $La_2O_3$, $Y_2O_3$"--.

Signed and Sealed this  
Twenty-fifth Day of July, 2017

Joseph Matal  
*Performing the Functions and Duties of the  
Under Secretary of Commerce for Intellectual Property and  
Director of the United States Patent and Trademark Office*